US007647360B2

(12) United States Patent  
Kano

(10) Patent No.: US 7,647,360 B2
(45) Date of Patent: Jan. 12, 2010

(54) SYSTEM AND METHOD FOR MANAGING A CONSISTENCY AMONG VOLUMES IN A CONTINUOUS DATA PROTECTION ENVIRONMENT

(75) Inventor: Yoshiki Kano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 467 days.

(21) Appl. No.: 11/471,105

(22) Filed: Jun. 19, 2006

(65) Prior Publication Data

US 2007/0294274 A1 Dec. 20, 2007

(51) Int. Cl.
  G06F 12/00 (2006.01)
  G06F 17/00 (2006.01)
(52) U.S. Cl. ........................................ 707/200; 707/101
(58) Field of Classification Search .................. 707/8, 707/201, 101, 200
  See application file for complete search history.

(56) References Cited

U.S. PATENT DOCUMENTS

| 6,088,694 | A * | 7/2000 | Burns et al. .................... 707/8 |
|---|---|---|---|
| 6,223,176 | B1 * | 4/2001 | Ricard et al. .................... 707/8 |
| 6,463,501 | B1 * | 10/2002 | Kern et al. .................... 711/100 |
| 6,496,944 | B1 * | 12/2002 | Hsiao et al. .................... 714/15 |
| 6,732,124 | B1 * | 5/2004 | Koseki et al. .................... 707/202 |
| 6,874,001 | B2 * | 3/2005 | Narang et al. .................... 707/203 |
| 6,898,688 | B2 * | 5/2005 | Martin et al. .................... 711/202 |
| 6,978,324 | B1 * | 12/2005 | Black .................... 710/31 |
| 7,406,488 | B2 * | 7/2008 | Stager et al. .................... 707/204 |
| 2003/0131253 | A1 * | 7/2003 | Martin et al. .................... 713/200 |
| 2004/0139125 | A1 * | 7/2004 | Strassburg et al. .................... 707/202 |
| 2004/0268067 | A1 * | 12/2004 | Yamagami .................... 711/159 |
| 2005/0022213 | A1 * | 1/2005 | Yamagami .................... 719/328 |
| 2005/0027742 | A1 * | 2/2005 | Eichstaedt et al. .................... 707/104.1 |
| 2005/0192962 | A1 * | 9/2005 | Furrer et al. .................... 707/8 |
| 2006/0047713 | A1 * | 3/2006 | Gornshtein et al. .................... 707/202 |

(Continued)

FOREIGN PATENT DOCUMENTS

EP  1 455 275 A2 *  9/2004

OTHER PUBLICATIONS

Düllmann, Dirk, et al., "Models for Replica Synchronisation and Consistency in a Data Grid", High Performance Digital Computing 2001, Aug. 7-9, 2001, pp. 67-75.*

(Continued)

Primary Examiner—Robert Stevens
(74) Attorney, Agent, or Firm—Sughrue Mion, PLLC

(57) ABSTRACT

Described is method and system for protecting file on volume based CDP and restoring data consistency between files and database managed by database application. One of the benefits of an implementation of the inventive concept is that administrator can protect a specific file by inserting a marker, which is stored on a journal volume after the close operation for a file. The data consistency between files and database is achieved even if the restore point is specified using a file attribute. One implementation includes host and storage subsystem. The storage subsystem may include multiple volumes for separately storing database tables and data files. The storage subsystem also includes a volume based CDP protecting the content of the storage volumes. The storage subsystem further includes an inventive consistency manager, which manages data consistency between the file volume(s) and the database volume(s). The consistency manager operates when storage system administrator issues command to restore sets of the volumes to a predetermined state, which was existent at specific time point.

5 Claims, 21 Drawing Sheets

U.S. PATENT DOCUMENTS

2006/0136685 A1\* 6/2006 Griv et al. .................. 711/162
2007/0226219 A1\* 9/2007 Hwang et al. .................. 707/8
2007/0226438 A1\* 9/2007 Erofeev ..................... 711/162

OTHER PUBLICATIONS

Flouris, Michail D., et al., "Violin: A Framework for Extensible Block-level Storage", MSST '05, Apr. 11-14, 2005, pp. 128-142.\*

Li, Xuhui, et al., "Second-Tier Cache Management Using Write Hints", FAST '05: 4th USENIX Conf. on File and Storage Technologies, San Francisco, CA, Dec. 13-16, 2005, pp. 115-128.\*

Ji, Minwen, "Instant Snapshots in a Federated Array of Bricks", HPL-2005-15, HP Laboratories, Palo Alto, CA, Jan. 28, 2005, pp. i and 1-21.\*

"Continuous Protection System 1200i: Enterprise-class continuous data protection in a compact form," 2003, Revivo, Inc. URL: http://www.revivio.com/index.asp?p=prod_CPS_1200i, 1 page.

"Enterprise Rewinder User Guide," Feb. 2006, pp. i-42, XOsoft. URL: http://www.xosoft.com/documentation/EnterpriseRewinder_User_Guide.pdf.

\* cited by examiner

| Parity Group | Size | RAID | Disk # | LDEV | Start LBA | End LBA | Size |
|---|---|---|---|---|---|---|---|
| 1 | 100TB | RAID5 | 1,2,3,4 | 1 | 0 | 1073741823 | 1GB |
| | | | | 2 | 1073741824 | 2147483647 | 1GB |
| | | | | ... | ... | ... | ... |
| 2 | 200TB | RAID1 | 10,11,12,13 | 10 | 0 | 2147483647 | 2GB |
| | | | | ... | | | |
| 3 | 1TB | RAID1 | ... | ... | ... | ... | ... |
| | | | | ... | | | |
| 4 | 2TB | ... | | ... | | | |
| ... | ... | ... | | ... | | | |

Fig. 3

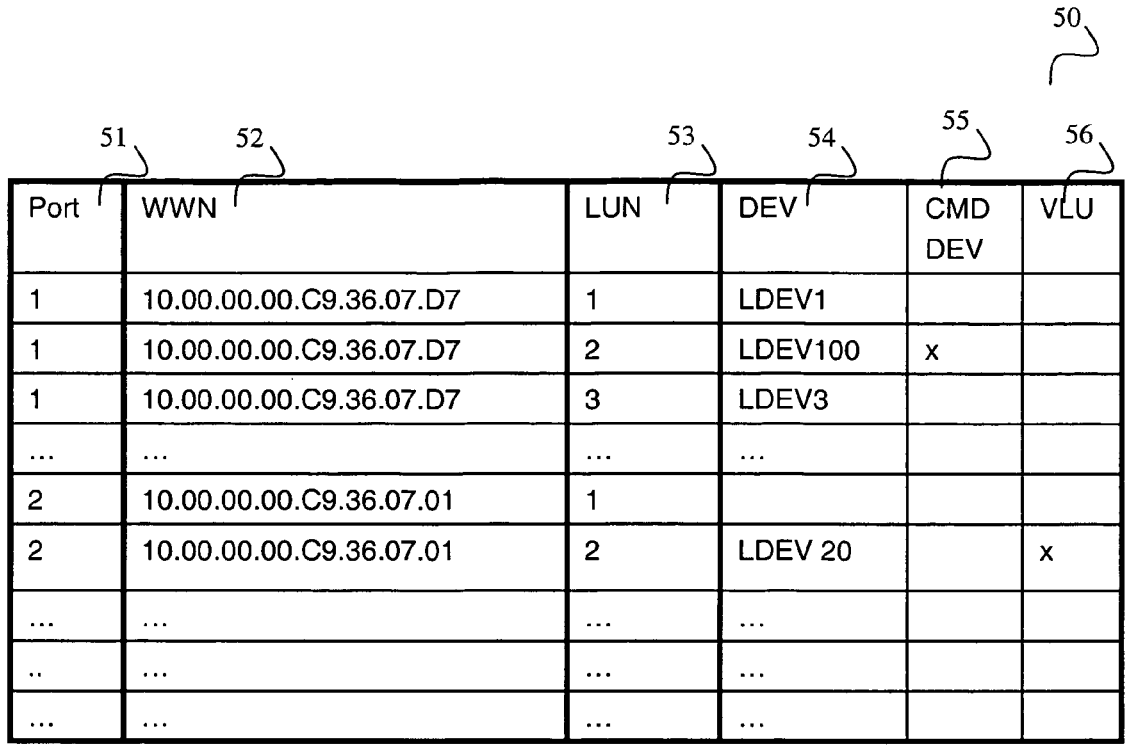

Fig. 4

VolumeDependency(InstanceNameOfDependency MasterLDEVNum, SlaveLDEVNum, attribute ...)

InsertMarker(Instance, LU, numOfLDEV, attribute);

ListMarker(Instance, CTGroupName);
SearchMarker(Instance, attribute)

CreateVLU(Instance, WWN, LUN );
DeleteVLU(Instance, WWN, LUN;

MapImageToVLU(Instance, time_t time, Marker, Virtual LU);
DMapImageToVLU(Instance, time_t time, NameOfDepedency attribute, Virtual LU);

UnMapImageFromVLU(Instance, t_time time, Virtual LU);

Fig. 5

| LDEV | CDP Protection After JNL | After JNL | |
|---|---|---|---|
| | | Base LDEV 65 | JNL LDEV 66 |
| 1 | Yes | 100 | 201 |
| 2 | No | - | - |
| 3 | Yes | 101 | 202 |
| ... | ... | ... | ... |

Fig. 6

| Name | Master LDEV | Slave LDEV | Attributes | | | ... |
|------|-------------|------------|------------|---|---|-----|
| | | | 1st attribute for data consistency 174 | 2nd attribute for data consistency 175 | 3rd attribute for data consistency 176 | |
| App1 | 3 | 1 | Path | filename | version | ... |
| ... | ... | ... | ... | ... | ... | ... |
| ... | ... | ... | ... | ... | ... | ... |

Fig. 12

SYSTEM AND METHOD FOR MANAGING A CONSISTENCY AMONG VOLUMES IN A CONTINUOUS DATA PROTECTION ENVIRONMENT

FIELD OF THE INVENTION

This invention relates to protecting computer data and, more specifically, to systems and methods for continuous data protection.

DESCRIPTION OF THE RELATED ART

Volume based Continuous Data Protection (CDP) technology provides around-the-clock user data protection by storing every write input-output (IO) operation from a user application in a special journal. The CDP journal is stored on a storage system, which is independent from the primary storage used to store the user data. The modern CDP systems are capable of recording various application events, such as application checkpoints. As it is well known to persons of skill in the art, at the application checkpoint, the entire state of the application at a certain point in time is being saved to a storage device such that the application may subsequently be restarted from the same time point using the saved state information.

An exemplary storage based CDP system is described in U.S. published patent publication No. US2004/0268067 A1, which is incorporated herein by reference in its entirety. This system provides copy on write journaling capabilities and keeps a unique sequence number for all journal and snapshot records.

There are also several commercially available products. One of the most popular enterprise CDP products is REVIVO CPS 1200i (http://www.revivo.com/index.asp?p=prod_CPS_1200i). This product mirrors IO operations on the host and forwards the IO information to a CDP appliance. The appliance, in turn, receives the information on the mirrored IO operations and stores these IO as a journal. The journal records are marked with indexing information to enable subsequent restore.

Another available commercial CDP product, which is capable of detecting application behavior, is XOSoft's Enterprise Rewinder (http://www.xosoft.com/documentation/EnterpriseRewinder_User_Guide.pdf). This product can detect various events (e.g. checkpoints) associated with various user applications, such as Microsoft® Exchange®. The detected events are used by the aforesaid product to optimize the CDP operation.

As would be appreciated by those of skill in the art, there exist numerous database (DB) applications, which provide file management functionality. The aforesaid volume based CDP technology can be used to protect data stored in each database. However, the use of the CDP technology in the context of database data protection presents two major challenges. First, the existing CDP systems offer very limited data file protection from user error and/or system failure, such as software error or hardware error on a host. Second, it is often difficult to keep a consistency between the state of the database and the data files during the restore operation because the database application files stored in a storage system may not always accurately reflect the current operational state of the database.

Accordingly, the existing CDP solutions suffer from one or more of the foregoing limitations. Therefore, new technologies for CDP are required.

SUMMARY OF THE INVENTION

The inventive methodology is directed to methods and systems that substantially obviate one or more of the above and other problems associated with conventional techniques for continuous data protection.

In accordance with one embodiment of the inventive concept, there provided a computer-implemented method involving creating a volume dependency between a filesystem volume and a database volume. The filesystem volume is associated with a first journal and the database volume is associated with a second journal. The inventive method further involves storing metadata associated with a file to a database associated with the database volume; writing update data to the file in the filesystem volume and closing the file in the filesystem volume. The method further involves inserting a first marker into the first journal, the first marker descriptive of the file closing operation; performing a consistency state operation in the database associated with the database volume; and inserting a second marker into the second journal. The inserted second marker is descriptive of the consistency state operation.

In accordance with another embodiment of the inventive concept, there provided a computer-implemented method, which involves creating a volume dependency between a filesystem volume and a database volume. The aforesaid filesystem volume is associated with a first journal and the database volume is associated with a second journal. The inventive method further involves storing metadata associated with a file to a database associated with the database volume; writing update data to the file in the filesystem volume; closing the file in the filesystem volume; inserting a marker into a journal, the marker descriptive of the file closing operation; updating the file; and performing a consistency state operation in the database associated with the database volume.

In accordance with yet another embodiment of the inventive concept, there provided a computerized storage system. The inventive storage system includes a storage subsystem and a host. The storage subsystem includes a journal manager; a filesystem volume; a database volume; a first base volume storing a point in time copy of the filesystem volume; a second base volume storing a point in time copy of the database volume; a first journal; and a second journal. The host includes a filesystem, a database, an application and an agent. The filesystem stores a file in the filesystem volume, while the database storing metadata associated with the file in the database volume. The application is configured to: store metadata associated with a file in a database; write update data to the file in the filesystem; close the file in the filesystem volume; and perform a consistency state operation. The agent creates a dependency between the filesystem volume and the database volume; inserts a first marker into the first journal, the first marker descriptive of the file closing operation; and inserts a second marker descriptive of the consistency state operation into the second journal.

In accordance with yet another embodiment of the inventive concept, there provided a computerized storage system. The inventive storage system includes a storage subsystem and a host. The storage subsystem includes a journal manager; a filesystem volume; a database volume storing a database tablespace; a base volume storing a point in time copy of the filesystem volume and a journal. The host includes a filesystem storing a file in the filesystem volume; a database storing metadata associated with the file in the database volume and an application, which includes a consistency manager and an agent. The application stores metadata associated with a file in a database, writes update data to the file in the filesystem; closes the file in the filesystem volume; and performs a consistency state operation. The agent creates a dependency between the filesystem volume and the database volume; and inserts a marker into the journal. In accordance with the inventive concept, the inserted marker describes the file closing operation.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 3 illustrates an exemplary embodiment of a logical devices configuration table.

FIG. 4 illustrates an exemplary mapping table between an LU and LDEV.

FIG. 5 illustrates a list of certain exemplary application programming interfaces of the agent.

FIG. 6 illustrates an exemplary mapping between the target volume and the volumes associated with the After JNL mechanism of the CDP.

FIG. 12 illustrates an exemplary embodiment of a volume dependency table.

DETAILED DESCRIPTION

Figure 1:
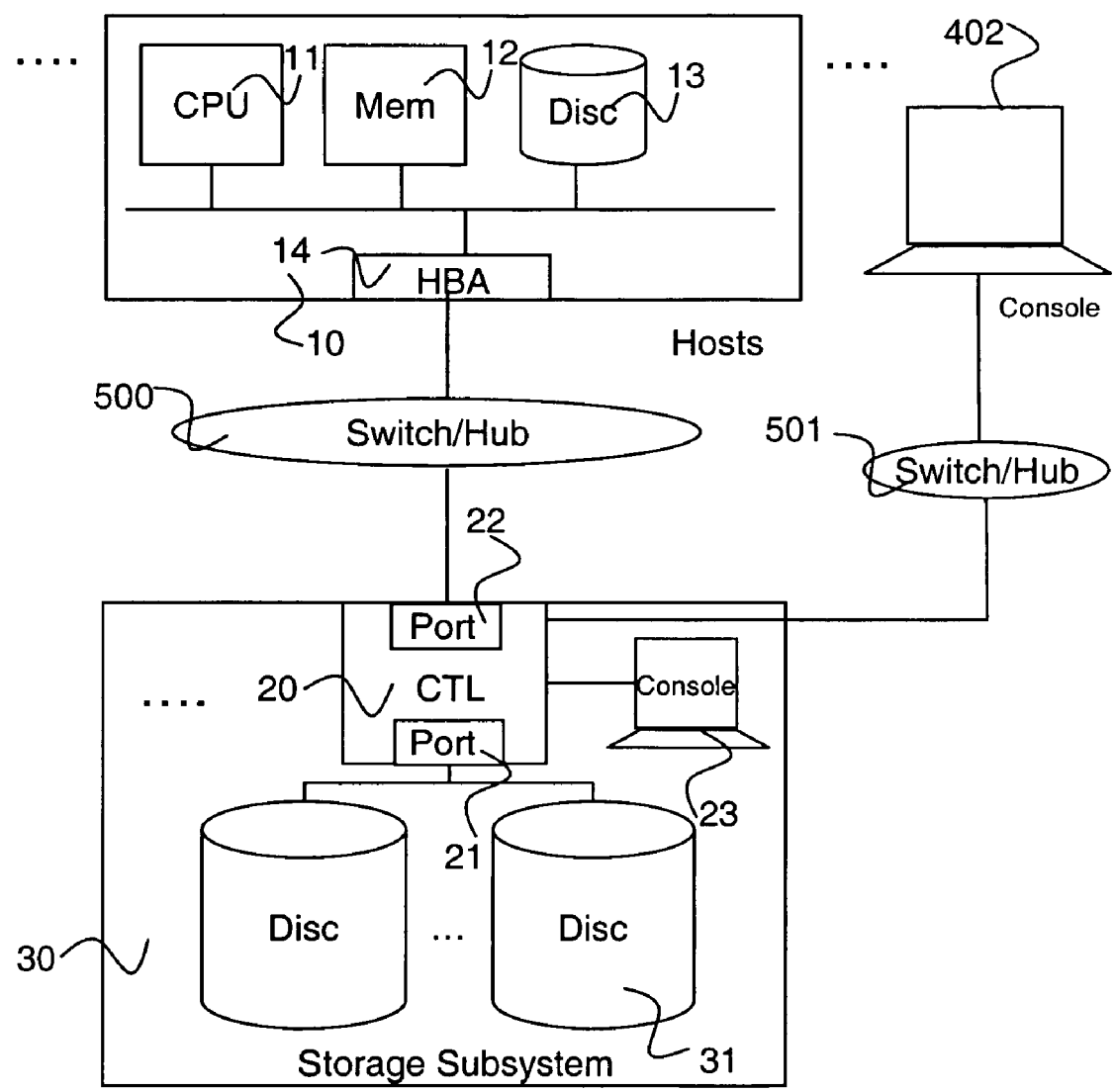
FIG. 1 shows a schematic diagram illustrating the hardware components and interconnections among these components in a system upon which an embodiment of the inventive concept may be implemented.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

The inventive concept involves a method and a system for protecting a file on a volume based CDP and restoring a data consistency between files and a database managed by a database application. One of the benefits of an implementation of the inventive concept is that administrator can protect a specific file by inserting a marker, which is stored on a journal volume after the close operation for a file. The data consistency between files and database is achieved even if the restore point is specified using a file attribute.

Three exemplary embodiments of the invention described herein may achieve this as well as other goals. One exemplary system configuration upon which the inventive concept may be implemented includes a host and a storage subsystem. The storage subsystem may include multiple volumes for separately storing database tables and data files. The storage subsystem also includes a volume based CDP protecting the content of the storage volumes. In accordance with the inventive concept, the storage subsystem also includes an inventive consistency manager, which manages data consistency between the file volume(s) and the database volume(s). The consistency manager operates when an administrator, such as a storage administrator or an application administrator, issues a command to restore sets of the volumes to a predetermined state, which was existent at a specific past point in time.

First, certain terms used in the following description will be defined. Specifically, the term logical unit (LU) refers to a unit used to access stored data from the host using a SCSI command executed on a storage subsystem. The logical unit is mapped to at least one logical device.

A logical Unit Number (LUN) is a number identifying each logical unit. The LUN is used to specify the target logical unit in SCSI commands. Each LU is addressed using a set of World Wide Name (WWN), identifying the port, and the LUN, identifying the storage device attached to the port.

A logical device (LDEV) or volume is a storage area, capable of storing data in the storage subsystem. It consists of at least one physical disc.

A restore image is an LDEV storing a restored version of data. The restore image is obtained by applying the journal data to a point-in-time copy of the data.

Virtual LU is a logical unit, which is accessible from host regardless of the existence of logical devices associated with the logical unit.

Marker is a record, which is sent from host's agent to storage subsystem.

Header/Footer information is a metadata record stored in a journal, which includes data and marker information received from the host

FIRST EMBODIMENT

The first embodiment of the inventive concept implements the capability of the inventive CDP deployed on a storage subsystem to manage data consistency between a database and a file. One of the features of the described embodiment enables the storage system administrator to protect a file by means of inserting a marker. The inserted marker is written to a journal volume after the close operation for the corresponding file is completed. The stored marker ensures the data consistency between files and the associated database under their application even if they specify a restore point which is specified by an attribute for a file.

Physical Configuration

FIG. 1 shows a schematic diagram illustrating the hardware components and interconnections among these components in a system upon which an embodiment of the inventive concept may be implemented. The shown system embodiment includes at least one host 10 coupled to one or more storage subsystems. The host 10 includes an operating system (OS) executing on computer hardware, which may be implemented in the form of a standard workstation or a personal computer. The host 10 has a CPU 11, memory 12, and internal disc 13. The host may also include a host bus adapter (HBA) 14 operable to connect to a fibre channel (FC) switch or an Ethernet switch 500.

Each host may store application data on a separate logical storage unit (LU) provided by the storage subsystem 30. In one embodiment of the inventive concept, the storage subsystem 30 has the capabilities detailed below. Specifically, the storage subsystem is capable of storing data within its LUs using SCSI-2 or SCSI-3 command sets. The storage subsystem 30 may incorporate one or more RAID controllers (CTL) 20 and several storage disc drives (disks) 31.

Each RAID controller 20 may include one or more processors as well as memory devices. In addition, the RAID controller 20 may include one or more network interfaces (NIC) such as Ethernet and FC ports 21 and 22 which be used to connect the RAID controller 20 to storage area network (SAN) and/or to storage disc drives 31. The RAID controller 20 processes SCSI I/O operations received from the host 10 and may support various RAID configurations utilizing several storage disc drives 31 provided within the storage subsystem 30.

The controller 20 preferably includes non-volatile random access memory (NVRAM), which is utilized to store data for caching purposes. The data stored in the NVRAM may be protected against loss due to, for example, power failure. In one embodiment of the invention, the NVRAM is implemented as a battery powered dynamic random access memory (RAM).

The RAID controller 20 enables the storage subsystem 30 to be accessible through FC ports addressable using the WWN (World Wide Name) addressing convention. As well known to persons of skill in the art, the WWN address specifies the ID of the target storage device in the SCSI world, and consists of a LUN on a FC port.

The storage subsystem 30 additionally includes a management console 23 which may be internally connected to the storage subsystem 30. The management console 23 may be accessible from a general-purpose console, such as a web-based PC or a workstation, and may be used to manage the storage subsystem. The internal console 23 may be used primarily by the maintainer of the storage subsystem 30. The console 402 may be used by storage administrator and may be located remotely from the storage subsystem 30. The console 402 may be accessible from a network switch or hub 501.

Logical Configuration

Figure 2:
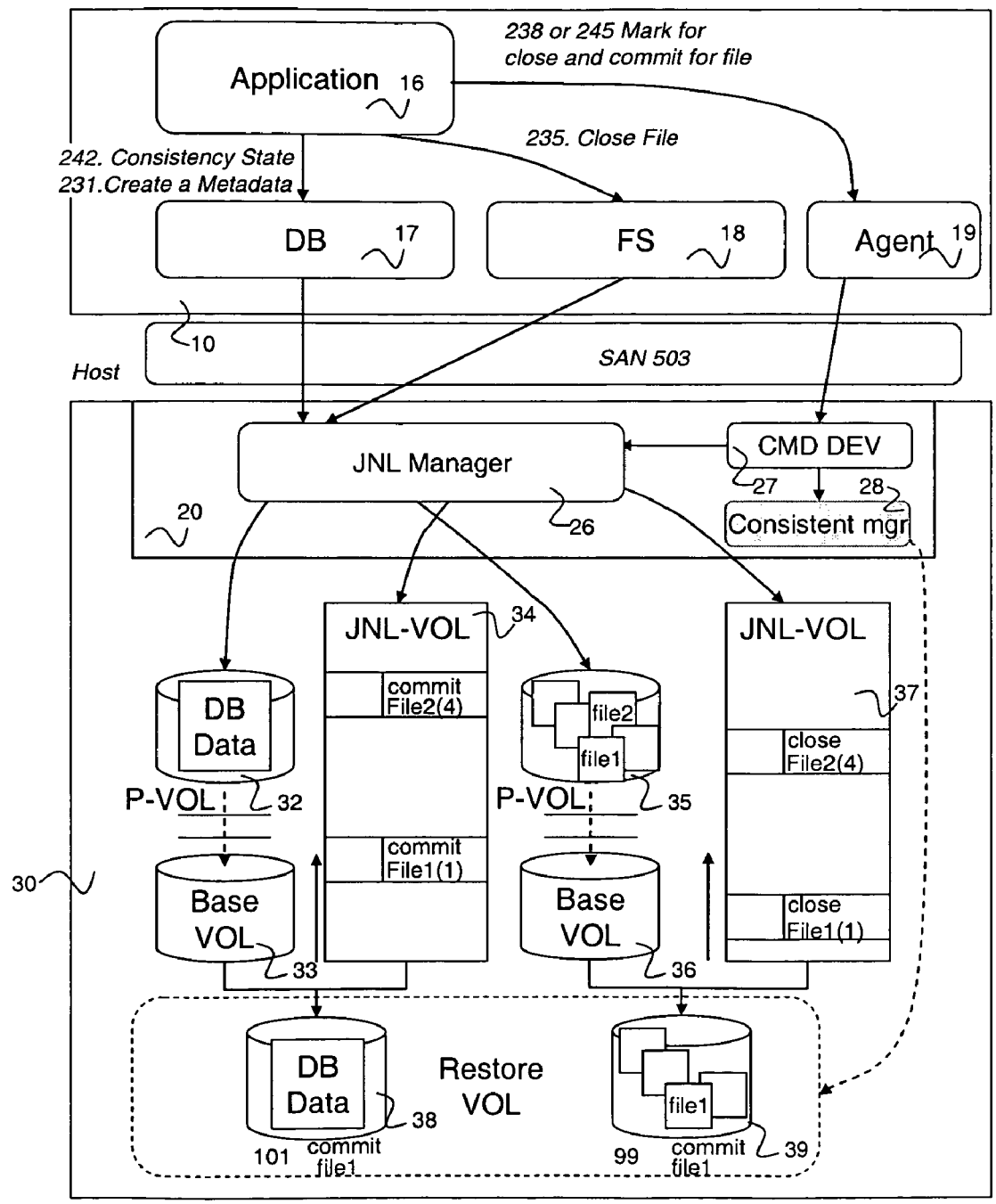
FIG. 2 shows a diagram illustrating an exemplary logical configuration of various software components of an embodiment of the inventive system as well as logical interconnections among these software components.

FIG. 2 shows a diagram illustrating an exemplary logical configuration of various software components of an embodiment of the inventive system as well as logical interconnections among these software components.

Host

Host 10 may operate under control of an operating system (OS) (not shown in the FIG. 2), and may execute application 16. Additionally, the host 10 may incorporate database (DB) 17, filesystem (FS) 18 and agent 19. The aforesaid OS may be UNIX, MICROSOFT WINDOWS, SUN SOLARIS, IBM'S ZIOS OR AIX. As would be appreciated by those of skill in the art, the exact nature of the OS executing on the host 10 is not essential to the concept of the present invention. The application 16 is a database-based application such as SAP, WEBLOGIC, PEOPLESOFT, ORACLE, CRM (Customer Relational Management, or PACS (Picture Archiving and Communication System). The application 16 may itself be a part of the DB 17. In this case, the application 16 may be integrated within one or more of the database management system (DBMS) modules.

The database 17 may be a general purpose DBMS such as ORACLE, DB2, MS SQL, SYBASE, INFORMIX and the like. As would be appreciated by those of skill in the art, the specifics of the DBMS system 17 are not essential to the inventive concept.

The filesystem 18 may be a general-purpose filesystem, such as UFS (Unix File System), NTFS, ext2/3 and the like. The agent 19 is configured to communicate with the storage subsystem 30. In one embodiment of the invention, the communication between the agent and the storage subsystem may be implemented using a technology which enables the agent to control the storage devices of the storage subsystem 30 using SCSI command sets. The aforesaid technology for controlling the storage subsystem 30 using SCSI commands is described in detail in European patent application No. EP1246050, which is incorporated herein by reference in its entirety. It should be noted that the agent 19 of the embodiment of the inventive system shown in FIG. 2 (RM) is generally equivalent to the RMLIB, while the command device 27 (CMD DEV) is generally equivalent to the CM described in the EP1246050.

The agent 19 has several application programming interfaces (APIs) to control the CDP deployed on storage subsystem 30. FIG. 5 shows a list of certain exemplary APIs of agent 19. Each function call in the shown APIs requires a specific instance number. The instance is created after a communication path is established between the agent 19 and the CMD DEV 27. Each function call uses the aforesaid provided instance number in order to communicate with the storage subsystem 30. The specific functions shown in FIG. 5 are described in detail below.

VolumesDependency function creates a dependency with respect to a specified attribute between a first volume and a second volume, in order to provide for data consistency during the volume recovery. The operation of this function can be best illustrated in the context of a storage subsystem having two volumes. One of the two volumes hosts the file system. The other volume hosts the database. There is a dependency between the first volume hosting the file system and the second volume hosting the database with respect to a version of a file. The dependency information is not only inserted into the journal as a marker attribute, but also stored in the internal memory of the Controller 20. The details of the aforesaid marker attribute will be described in detail below. A file system volume stores a file, which, at some point, is closed by the 'close' system call. The closed file has a version 4. The closing of the file is reflected in the file system journal by a marker corresponding to the file closing operation. After the file is closed by the file system, the corresponding database journal volume also stores a commit marker corresponding to the closed file. Subsequently, at a future time, the administrator instructs the system to restore a set of volumes. The inventive system determines the existence of the dependency and uses the journal markers to recover both the file system and the database to a consistent state corresponding to the same version 4 of the file.

The VolumesDependency function call requests the consistency manger to create a dependency. The dependency is created by specifying LDEV numbers of the master and slave volumes as well as the attribute, which enables the data consistency as a key. Examples of such an attribute include, without limitation, a path, a filename, and a version for the file. When the VolumesDependency function call is executed with appropriate parameters, the consistency manager 28 inserts an appropriate record into the volume dependency table 170, shown in FIG. 12. The table includes the name of dependency column 171, master LDEV number column 172, slave LDEV number column 173 as well as attribute columns 174 to 176, which become key for data consistency when consistency manager 28 keeps data consistency between master and slave volume. The master LDEV is called a parent volume, while the slave LDEV, having the dependency from the master LDEV, is called a child volume.

InsertMarker function creates a maker for a user-specified logical device (LDEV) associated with a specific logical unit (LU). The input parameters of the InsertMarker function include a field and a value. Examples of the field parameter in this embodiment include actions that may be performed by an application (commit or close) as well as a path, filename, or a file version. The field parameter may hold a transaction identifier, hash such as MD-5 and SHA-1 or other kind of identifier descriptive of the state of the application. The value parameter corresponding to the action field may be either commit or close, the value corresponding to the path field may include a directory path, such as /u03/files. Other examples of the value parameter of the aforesaid function include a filename as well as file version number counted from 1.

ListMarker function produces a list of all markers in the journal, which match user-specified parameters of this function. When the function is executed on a storage subsystem, the journal manager, which will be discussed in detail below, reads the markers from the journal, together with their attributes. To minimize the performance impact on the journal, the markers may be stored in a cache memory. The result provided by the function includes a marked time and the attribute associated with the marker.

SearchMarker function instructs the journal manager of the storage subsystem to search for a specific marker using a user-specified attribute. The searched attribute is located in the header of a journal record. The storage subsystem returns the results of the search, including an indication of whether the marker is found, and, if the marker is found, the sequence number of the marker as well as the searched attributes including the fields and the associated values.

CreateVirtualLU function requests to create a virtual LU within the storage subsystem. The virtual LU will be described in detail below.

DeleteVirtualLU function requests the storage subsystem to delete an existing virtual LU from a specified port. After the deletion of the virtual LU, the storage subsystem deletes an entry corresponding to the virtual LU and the port from the DEV column 56 of the LU/LDEV mapping table shown in FIG. 4.

MapImageToVLU function requests the storage subsystem to create a restore image. Upon the receipt of this command, the journal manager creates a restore image specified by an attribute, which will be discussed in detail below. The image is created by applying journal entries to the base volume up to the journal marker specified by attributes associated with the file close/file commit operation. After the restore image is created, the storage subsystem maps the created restore image to one of the Virtual LUs. After the restore image is created, the journal manager inserts the LDEV number corresponding to the restore image into the DEV column 54 for an appropriate LU in the mapping table shown in FIG. 4.

DMapImagesToVLUs function requests the creation of a set of restore images for a master and slave volumes, linked by a volume dependency. The operating sequence of this function will be discussed in detail below with reference to FIG. 14. After the DMapImagesToVLUs is called, the consistency manager 28 confirms the existence of the specified attribute's marker on journal volumes corresponding to the master and slave data volumes (steps 145 and 148 of FIG. 14). The marker attribute may store a path, filename, and version of the file. After the existence of the marker has been confirmed, the consistency manager 28 requests the journal manager to create restore images for master and slave volumes specifying the existing marker attribute. This creation request uses the MapImageToVLU function call (steps 149 and 151 of FIG. 14). Accordingly, the role of the DMapImagesToVLUs function is to find the attribute on the master and slave journal volumes and to request JNL manager to create master and slave restore images using the MapImageToVLU function and specified by the found attribute.

UnMapImageFromVLU function requests to un-map a restore image from a virtual logical unit (LUs). The JNL manager deletes the LDEV number for the restore image in DEV column 54 of the table shown in FIG. 4.

UnMapImagesFromVLUs function requests to un-map restore images from the created group of virtual logical units (LUs) using UnMapImageFromVLU function call.

In an embodiment of the invention, a command line interface is provided for the described functions. The parameters of such command line function calls are the same as those described above.

Storage Subsystem 30

In one embodiment of the invention, the various modules of the storage subsystem 30 are implemented as separate microcode modules, which are executed on the controller (CTL) 20. The aforesaid microcode software may be installed form an optical media, floppy disks, as well as other removable storage devices. The microcode may include a parity group manager as well as a logical device manager (LDEV Manager) (not shown in the figures). The logical device manager is configured to create a logical device (LDEV) in order to provide a logical storage unit, comprising one or more physical disk drives and accessible by application programs through the port 22. Finally, the microcode may be used to implement the Journal (JNL) Manager 26, which will be described in detail below.

Parity Group Manager (not Shown in the Figures)

The parity group manager is implemented in microcode and is configured to create and manage parity groups from the physical disk drives using the RAID0/1/2/3/4/5/6 technology, well known to persons of ordinary skill in the art. As wellknown in the art, the RAID 6 technology is based on RAID 5 technology, but includes a dual parity protection.

The created parity groups are listed in the logical devices (LDEV) configuration table 40 shown in FIG. 3. The aforesaid table includes a parity group number column 41 to identify each parity group within the storage subsystem 30, usable capacity size column 42, RAID configuration column 43 and constituent disc column 44. The capacity size column 42 stores information on the aggregate capacity of each RAID group. The RAID configuration column 43 stores the type of the RAID technology used to create the corresponding parity group, while the constituent disc column 44 identifies all the physical disk drives forming the RAID group.

Logical Device Manager (not Shown in the Figures)

The LDEV manager residing within the controller 20 manages the structure of the logical device configuration. A logical device (LDEV) provides a logical storage area associated with a logical unit (LU), capable of storing data received from the host and furnishing the stored data to the host in response to received input/output operations. LDEV contains a portion of a RAID parity group. The storage system administrator defines the LDEV and performs initial formatting of the corresponding storage media. In addition, the administrator assigns an LDEV number thereto. The mapping between logical devices and parity groups is stored in the LDEV configuration table 40 shown in FIG. 3. The table includes a parity group number column 41 and a logical device number column 45. The LDEV number column 45 identifies, for each parity group, the logical devices of the storage subsystem which are included in that parity group. For each such LDEV, the table stores a start Logical Block Address (LBA) column 46 representing the LDEV's start address as well as an end LBA column 47 representing LDEV's end address. Finally, size column 48 provides the size of LDEV. The initial format of the storage media comprising the parity group is requested by the storage system administrator. The default value of the format data is 0. The format data can be changed by the administrator via console 23 or 402 to NULL or any other character.

Port 22

Port 22 resides within the controller 20 shown in FIG. 1. It provides the access to an LDEV via a logical unit (LU) and an associated WWN within the SAN 500. FIG. 4 illustrates an exemplary mapping table between an LU and LDEV. The mapping is performed using an LUN (Logical Unit Number) column 53 and LDEV column 54. Each record in the hardware port column 51 corresponds to one of the ports 22 shown in FIG. 1. Each port 22 is associated with a unique WWN, which is listed in the column 52 of the table. This WWN is included by the host into the input/output requests directed to the port. A plurality of LUs can be assigned to each port 22. Each LU is identified by a pair of WWN in column 52 and LUN in column 53. Based on the FC-SCSI protocol specifications, the maximum number of logical units that can be associated with a port is 256. Each LU is mapped to an LDEV, which is used to store data from the hosts 10. Based on this mapping information, the controller 20 receives SCSI commands on its port 22 and converts the set of WWN of column 52 and LUN of column 53 into the LDEV identifier of column 54 to access the appropriate LDEV.

Some logical units can be configured as CMD devices. When an LU is defined as CMD device by the administrator via the console 23 or 402, the record in the CMD DEV column 55 of the table shown in FIG. 4 is checked. The storage administrator creates an LU and specifies the created LU as a CMD DEV using the console 23 or 402.

Storage administrator can configure each LU as Virtual LU to make the LU available to the host even if the LU doesn't have an associated LDEV or an associated restore image. When the administrator sets LU as Virtual LU, the storage subsystem 30 turns on the VLU bit in column 56 of table 50. In this mode, the storage subsystem always makes the LU available to the host regardless of assignment of LDEV to the LU.

Virtual LU (Not Shown)

Initially, a virtual LU associated with a specific port is not mapped to any LDEVs. However, the virtual LU does have an associated logical unit number and, therefore, it can be accessed by the host using a function call specifying the appropriate port number as well as the aforesaid logical unit number of the virtual LU. Therefore, a host can access a virtual LU using a conventional SCSI command. After receiving a SCSI inquiry directed to a virtual LU, the controller 20 of the storage subsystem 30 issues a normal response considering that the corresponding LDEV is unmapped. For example, the size inquiry addressed to a virtual LU, returns the maximum storage system defined size. On the other hand, if the LU doesn't have any LDEVs and a SCSI Read/Write operation is directed to that Virtual LU, the controller 20 responds with an error message by means of a SCSI condition.

Upon the invocation of the CreateVLU function, the journal manager inserts an entry corresponding to the VLU into the column 56 of the mapping table shown in FIG. 4. The entry is inserted into a table row, which corresponds to an appropriate LUN and port number. In the event a restore image, which is built by applying a journal to a base volume, is mapped to virtual LU, the volume size inquiry directed to the virtual LU returns the size of the LDEV mapped to that virtual LU. When SCSI Read/Write operation is directed to the virtual LU, the read operation can proceed on the volume.

In addition, the virtual LU functionality helps to fix the order of device numbers because certain operating systems shuffle device names a new LU is attached. Using virtual LU, the correct or desired order can be restored. The table shown in FIG. 4 is managed by the application programming interface of the agent 19 shown in FIG. 2 and especially the MapImageToVLU and UnMapImageFromVLU calls which have been discussed hereinabove. The storage system administrator may use the console 23 or 402 to set or unset a virtual LU.

When the MapImageToVLU is called to create a restore image, the restore image is mapped to one of virtual LUs defined in the VLU column 56 of the table shown in FIG. 4 and associated with the same port, which is attached to the target volume. The target volumes, which include master and slave LDEV are described in dependency table 170 shown in FIG. 12.

Journal Manager 26

Journal Manager manages the After journal (JNL) for target LDEVs and supports the application marker operation. The detailed description of the After JNL mechanism will be provided below. But before that, the volume configuration will be discussed.

Configuration

The mapping between the target volume, which resides on an LDEV and stores the data, and the volumes associated with the After JNL mechanism is contained in the CDP configuration table 60 depicted in FIG. 6. The table includes the target LDEV number column 61. The value in the column 62 of the table 60 specifies whether the After JNL CDP mode is enabled. If the protection mode is enabled, the related CDP volume information 64 is also stored in the table 60. Specifically, the column 65 stores information on the Base LDEV and the column 66 identifies the JNL LDEV. If the After JNL mechanism is enabled, the base LDEV column 65 and JNL LDEV column 66 are specified. The information in the aforesaid columns is provided by the storage system administrator via the console 23 or 402.

After JNL Mechanism

Figure 7:
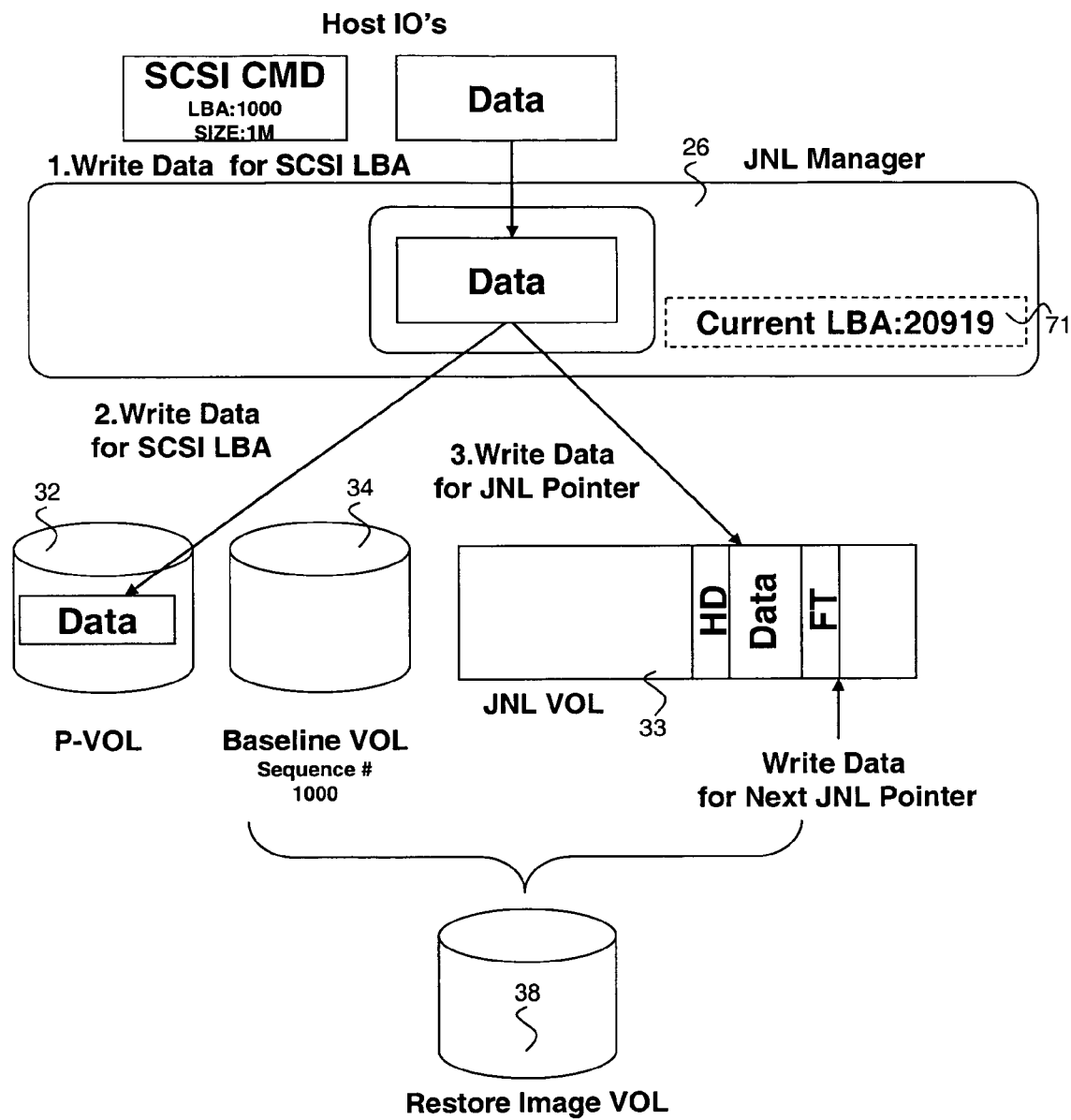
FIG. 7 provides an exemplary diagram of an embodiment of the After JNL mechanism.

FIG. 7 provides an exemplary diagram of an embodiment of the After JNL mechanism. The After JNL mechanism makes a history of all write operations received by the storage subsystem 30 from the hosts. The configuration shown in FIG. 7 includes a target Primary LDEV (Primary VOL) 32, a Base LDEV (Baseline VOL) 34 and a JNL LDEV (JNL volume) 33. The primary LDEV is also a target volume for the CDP. The Base volume 34 has a point in time copy of the data in the primary volume taken at the time when the journaling has started on the journal LDEV volume 33. The point in time copy of the data in the base volume is characterized by a sequence number, which is incremented after each journal operation and frozen after the creation of the point-in-time copy. The journal volume contains information on the I/O operations performed by the hosts as well as other related information, such as markers and attributes. The CMD device (not shown) enables communication between the host 10 and the storage subsystem 30 using SCSI in-band communication protocol well known to persons of skill in the art. The journal manager 26 has a journal pointer 71, which identifies the current write position on the journal volume. The value of the journal pointer starts from zero and represents to the logical block address (LBA) of the current write position. If the JNL volume includes a management area, such as a VTOC (Volume Table of Contents) or an MBR (Master Block Record) area, the start of the logical block address is shifted by the size of the respective management area.

Figure 8:
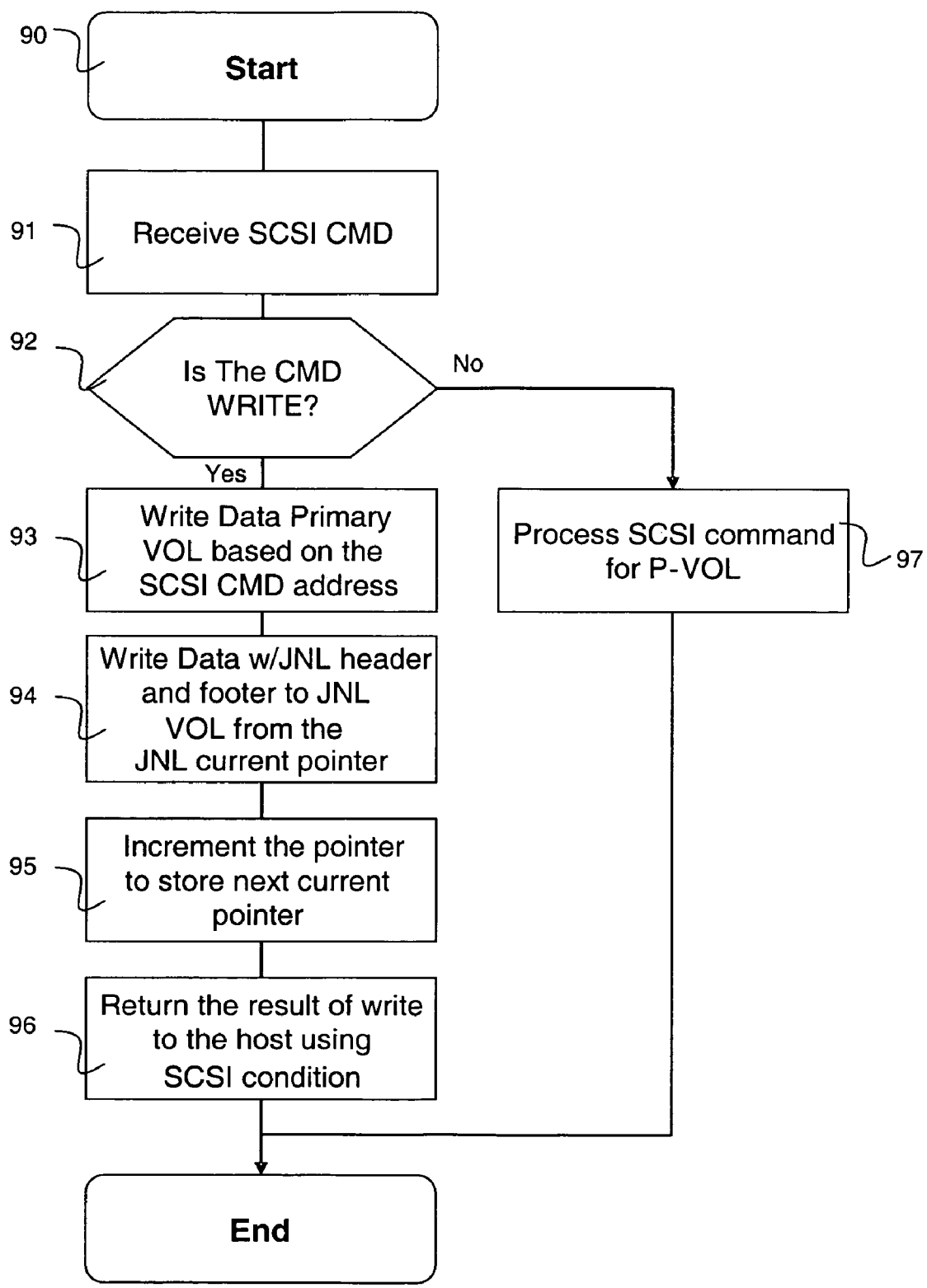
FIG. 8 illustrates an exemplary procedure for processing a SCSI write command addressed to the target LDEV in the system shown in FIG. 7.

FIG. 8 illustrates an exemplary procedure for processing a SCSI write command addressed to the target LDEV in the system shown in FIG. 7. The steps of the aforesaid procedure are described in detail below.

The procedure begins at step 91, whereupon the journal manager 26 receives the SCSI command, which is sent by the host 10, see procedure 1 in FIG. 7.

At step 92, the journal manager 26 checks whether the received command is a SCSI WRITE command, such as WRITE 6, WRITE 10, or the like. If the received command is determined to be a SCSI WRITE command, the operation proceeds to step 93. If it is not, the procedure continues with step 97.

At step 93, the journal manager writes the data associated with the received SCSI to the target primary volume, see procedure 2 in FIG. 7.

At step 94, the journal manager writes header (HD) information, described in detail below, the received data, as well as the footer (FT) information to the journal volume starting from the logical block address identified by the journal pointer to the journal volume 33, see procedure 3 in FIG. 7.

At step 95, the journal manager increases the journal pointer by the total size of the written header, data, and footer.

At step 96, the journal manager returns the result of the write operation to the originating host using the SCSI condition state.

At step 97, the journal manager executes other SCSI commands, such as READ 6 operation on the primary volume 32. Whereupon, the procedure terminates.

The header/footer information includes a header/footer bit, a sequence number identifying the I/O operation within the storage subsystem, command type information indicating the type of header/footer, which may include journal data, marker and the like. The header may include additional command information when the header type is journal data or marker. In addition, the header stores a marker attribute when the command type is a marker, the time when the journal manager received the associated I/O request, the information on the SCSI command which is received from the host, as well as the start address and the size information for the journal data. Finally, the footer carries the sequence number of the associated header.

The current sequence number is incremented by each header/footer insertion. If the sequence number reaches the maximum sequence number, it may restart from 0. In one embodiment of the invention, the size of the header/footer record is 2 KB, which is equivalent to the size of 4 logical blocks. As would be appreciated by those of skill in the art, the exact size of the header/footer is not essential to the inventive concept and other sizes may be used. For example, a larger header/footer size may be used to enable additional data to be written therein.

The restore operation may be initiated by invoking the MapImageToVLU function call issued by the host, which requests the storage subsystem to create a restore image. In response to the aforesaid function call, the journal manager creates a restore image specified by the marker attribute or the sequence number.

Upon the receipt of the restore instruction from the host 10 or from the host 10 via the console 23 or 402, the storage subsystem 30 creates a restore volume 38-39 corresponding to a point in time specified by a sequence number or time value. This is accomplished by applying the records in the JNL volume to the data in the base volume. Upon the creation of the restore volume, the JNL manager 24 maps it to a virtual LU. Before the mapping operation, the JNL manager 24 checks whether the Virtual LU is mapped to another restore volume. If another restore volume has been mapped to the same virtual LU and the last Read/Write access thereto took place within the last minute, the old mapping is preserved and a new virtual LU is used for mapping to the first restore volume. If the virtual LU is unmapped or if the last access is old, the mapped restore volume is unmapped and the corresponding LDEV is returned to the free LDEV pool. The aforesaid restore procedure will be discussed in detail below.

Figure 9:
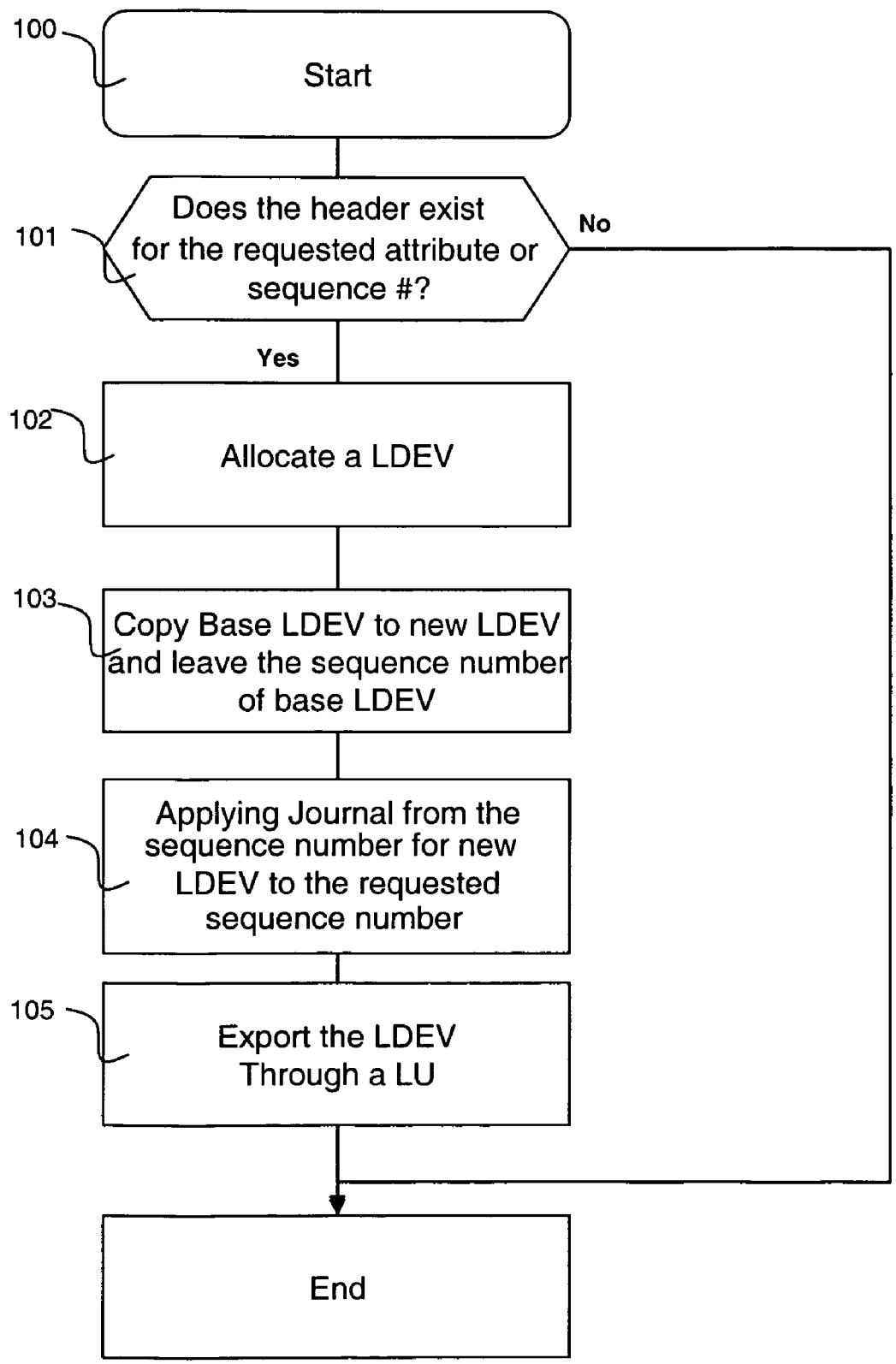
FIG. 9 shows an exemplary procedure for creating and mapping the image using the MapImagefromVLU function.

The procedure for creating the restore image is shown in FIG. 9.

The procedure starts with step 101, whereupon the journal manager searches for a journal header containing an attribute or a sequence number specified in the restore instruction. If such a header is located, the process continues to step 102. If the requisite header cannot be found, the process terminates and an error is returned.

At step 102, the journal manager allocates a logical device (LDEV) from an LDEV pool. Preferably, the allocated device has the same size as the size of the base volume. The aforesaid LDEV pool manages a list of all logical devices in the storage subsystem, and appropriately tracks both used and unused logical devices. To find an available volume of the correct size, the journal manager looks up the requisite size information in the column 48 of the LDEV Management table 40.

At step 103, the journal manager makes a copy of the base volume to the newly allocated volume. As stated above, the new volume is selected from the unused volumes in the volume pool of the storage subsystem 30. During the copy operation, the journal manager suspends the write operation for the volume until end of the copy operation.

At step 104, the journal manager applies journal records from the journal volume up to the point of the located header to the created copy of the base volume.

Finally, at step 105, the journal manager exports the resulting volume through a virtual LU mechanism. Whereupon the procedure terminates.

Marker

Figure 10:
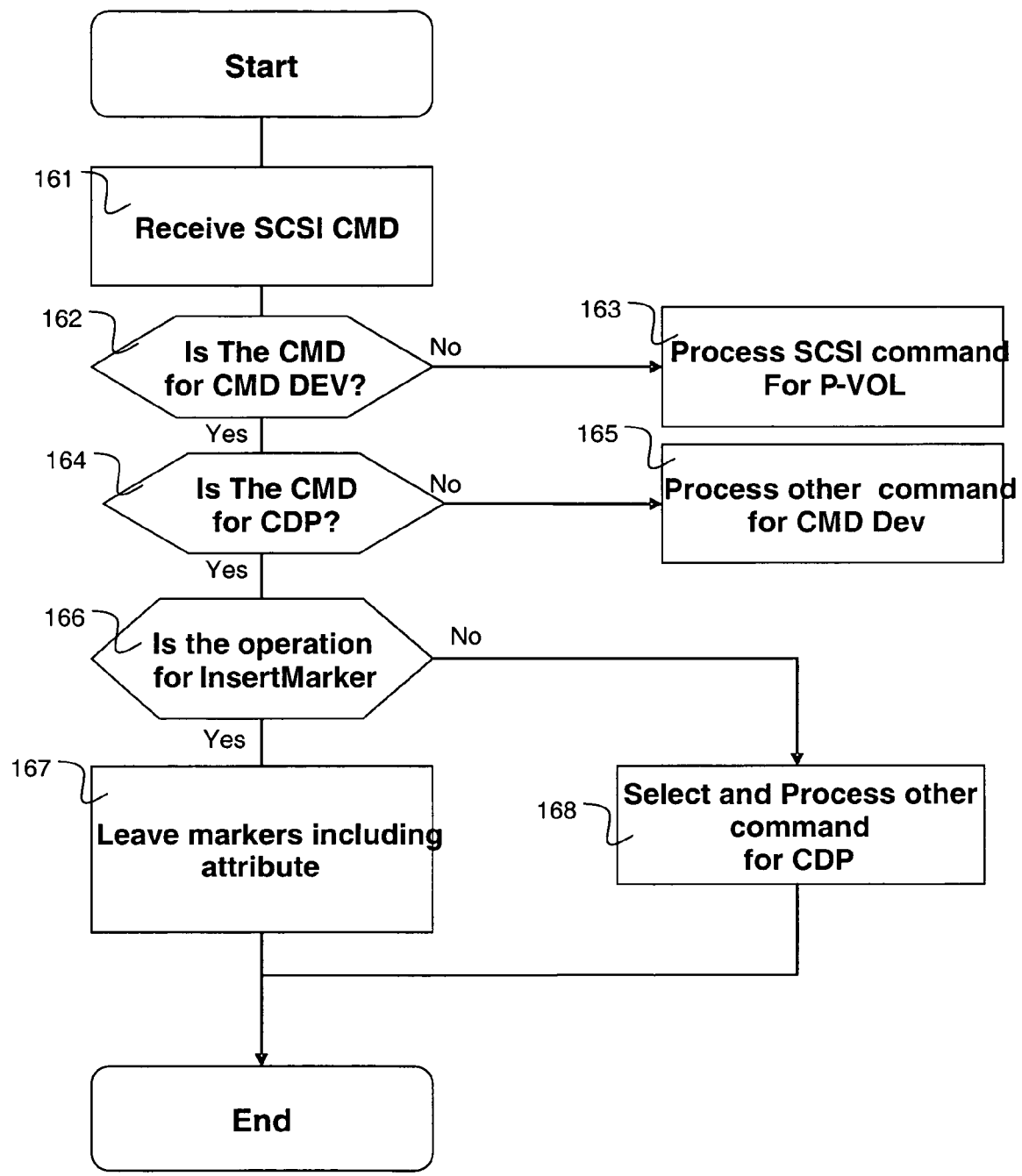
FIG. 10 shows an exemplary procedure for determining whether the received command related to marker insertion operation.

Before the processing of an SCSI I/O command received from the host in accordance with the aforesaid After JNL mechanism, the journal manager 24 first determines if the received command is the InsertMarker operation. The procedure for performing this function is shown in FIG. 10.

The procedure begins with step 161, whereupon the journal manager receives a SCSI command on the port 22 of the controller 20.

At step 162, the journal manager checks whether the received SCSI command is addressed to the CMD device. The checking is accomplished based on the command's target LUN, which is found the FCP_LUN record in a Fibre Channel Frame. The definition of relation between the LU and CMD device is listed on CMD DEV column 55 in the table 50. If the target LUN of the received SCSI command is for the CMD device, the procedure continues with step 164. If the target LUN associated with the received SCSI command does not correspond to the CMD device, the procedure goes to step 163.

At step 163, the journal manager processes the SCSI command for the Primary LDEV. After the completion of the step 163, the execution will continue with the step 90 of the procedure shown in FIG. 8, which involves checking each protection mode in column 62 of the table 60 shown in FIG. 6.

At step 164, the journal manager checks whether the received SCSI command involves a CDP operation based on above described API functions. If the received command involves a CDP operation, the procedure continues to step 166. If the command does not involve CDP transaction, the execution proceeds with step 165.

At step 165, the journal manager processes other commands addressed to the CMD device. Those commands may include local mirror or remote mirror-related operations such as SHADOWIMAGE and TRUECOPY, respectively, which are well known to persons of skill in the art. The aforesaid SHADOWIMAGE operation has several associated states for managing the local mirror operations. The general operational states include creating a volume pair consisting of a primary volume and secondary volume, splitting the pair, and resynchronizing the pair to create a synchronous data state between the primary and secondary volume. Other commands may operate to change the aforesaid states. In the TRUECOPY, operation, the states and commands are similar to the corresponding states and commands of the SHADOWIMAGE. However, the TRUECOPY additionally provides various commands for managing remote mirror configurations, such as a buffer on primary controller, bitmap between primary volume on primary and secondary storage subsystem and the like.

At step 166, the journal manager checks whether the received command involves an InsertMarker operation from host 10. In this case, the procedure continues with step 167. If the operation is not for InsertMarker, the execution proceeds to step 168.

At step 167, the journal manager stores the marker including the associated attribute in the journal LDEV or in the memory of the controller 20. In one implementation, the marker may be stored in the journal LDEV and in the memory at a same time.

At step 168, the journal manager selects other operations directed to the CDP and executes the selected operations. Whereupon, the procedure terminates.

It should be noted that at step 167, the journal manager stores the marker on the journal volume. Upon writing data to the journal, the journal manager also writes a header and footer information, which indicates the CDP type "maker", to journal LDEV.

Console (not Shown in FIG. 2)

The console 402 enables the storage administrator to manage the storage subsystem 30 via LAN/WAN 501. The console 402 provides graphical user interfaces (GUIs) useful in the creation of LDEV, as well as tools for mapping of LDEVs to Logical Units (LUs) and the creation of LDEV pools. As would be appreciated by those of skill in the art, the console 402 is not limited to the described functionality and may perform other management functions.

Storage Area Network (SAN)

SAN 503 provides a logical coupling between the host 10 and the storage subsystem 30. The SAN 503 may be implemented based on a switch or hub, operating in accordance with FC and/or Ethernet architectures. In one embodiment of the invention, the SAN is based on a fibre channel switch or hub. In another embodiment of the invention, the SAN is based on Ethernet switch or hub. As would be appreciated by those of skill in the art, the specifics of the design of the SAN 503 are not essential to the inventive concept and various other SAN architectures may be employed.

Local Area Network and Wide Area Network

Local area network and wide area network (LAN/WAN) provide a logical connection between the aforesaid console 402 and the storage subsystem 30. The LAN/WAN may be implemented using networking switches operating in accordance with Ethernet, FDDI, Token ring or other similar networking protocols. The storage subsystem 30 is connected to the LAN/WAN in order to enable access thereto from other hosts, which may access the storage subsystem 30 for management as well as other purposes.

System Configuration

Before the inventive system can be used, is must first be configured. In the exemplary system configuration described herein, it is assumed that the After Journal CDP mechanism is utilized for the protection of the primary LDEV. As would be appreciated by those of skill in the art, the inventive system may likewise operate in accordance with the Before JNL mechanism. Therefore, the exact nature of the CDP journaling technology is not essential to the concept of the present invention.

The procedure for configuring the inventive CDP system will now be described. The configuration procedure for the inventive CDP system will be described in connection with FIG. 2. First, the storage administrator allocates target primary volumes for the database 32 and for the file system 35, CMD device 27, base volumes 33, 36, and the journal volumes 34, 37 and maps the target primary LDEV and the CMD device to each logical unit on the port 22. In addition, the storage administrator creates a relationship among the target primary volumes, base volumes and journal volumes, using the CDP configuration table 60, which may be accessed via the console 23 or 402.

The storage administrator additionally creates the Virtual LUs for restore images via the console 23 or 402 or by using the agent 19. The server administrator subsequently installs the operating system (OS) on the host 10 and identifies the logical units including the target volume and the CMD device. Database administrator (DBA) or the server system administrator installs the agent 19 on the host 10 and establishes the communication with the CMD device.

A DBA or an application administrator installs the database and the application 16, which issues calls to the API of the agent 19, upon the occurrence of the application's file storing events.

Exemplary Operating Method

The user application stores meta-data containing the file management information in the database. Essentially, the application stores the close and commit events for a file in the journal volume as attributes associated with a marker.

The tablespace of the database is created first. The database stores and manages the file metadata in a form of records stored in database tables. The file metadata may include the file path within the filesystem, as well as the filename, creation time, modification time and version number. The application administrator also creates a volume dependency marking the filesystem volume as a master volume and the database volume as slave volume using the VolumeDepdency function call, see step 230 of FIG. 11.

Figure 11:
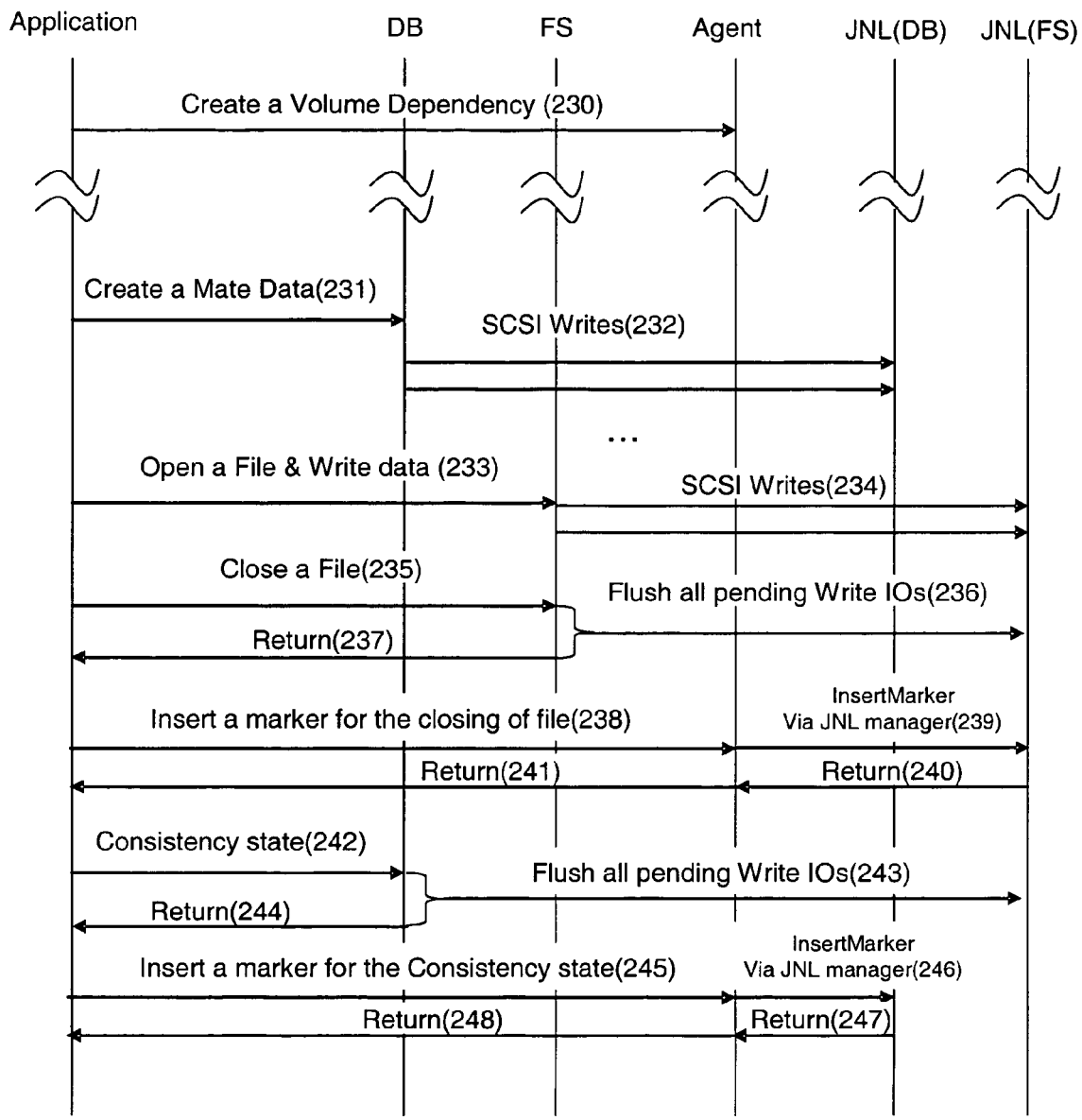
FIG. 11 illustrates an operating sequence of an embodiment of the inventive concept.

When the application stores a file within a file system, the application executes following steps, which are illustrated in FIG. 11.

At step 231, the application creates new metadata for the file.

At step 232, the database updates the table space data for the new metadata on a database volume, which is designated as a slave volume. The journal manager stores the update data within the database journal.

At step 233, the application opens the file within the filesystem and writes the file data to the opened file.

At step 234, the filesystem writes the updated file data to the volume storing filesystem data, which is designated as a primary volume. At the same time, the journal manager stores the updated data to the journal corresponding to the filesystem volume.

At step 235, the application 16 closes the file on the filesystem 18.

At step 236, the filesystem flushes all pending write input-output operations to the filesystem storage volume. Upon the completion of this step, the file data actually stored the filesystem storage volume accurately reflects the state of the file within the filesystem, with no unfinished write operations directed to the file pending.

At step 237, the filesystem returns the result to the application confirming the successful completion of the file closing operation. After the completion of this step, one or more sync commands may be performed on the filesystem.

At step 238, the application inserts a marker with an attribute into the filesystem journal. The inserted attribute indicates, for example, the version of the file on the master volume. The file versions are sequentially numbered starting from zero. The application increments the version number of the file each time the file is created, modified or deleted.

At step 239, the agent inserts the marker using the InsertMarker function call. The journal manager stores the marker on the filesystem journal.

At step 240, the journal manager returns the result of the marker insertion operation to the agent.

At step 241, the agent returns the result of the marker insertion operation to the application.

At step 242, the application issues a request for a consistency state to the database. An example of the consistency state request is execution of a commit command in a database management system.

At step 243, in response to the received consistency state request, the database flushes out all pending input-output write operations to the database storage volume.

At step 244, the database returns the result of the execution of the request for consistent state back to the application.

At step 245, the application sends a request to the agent to insert a marker corresponding to the commit operation relating to the file metadata into the master journal for database, which is designated as slave volume. The attribute associated with the marker carries information on the path information, filename, and the version of the file.

At step 246, the agent inserts the marker into the master journal using the InsertMarker function call.

At step 247, the journal manager returns the confirmation of the successful marker insertion to the agent.

At step 248, the agent returns the result of the marker insertion request back to the requesting application, whereupon the aforesaid procedure terminates.

It should be noted that after the completion of the aforesaid steps 238 and 245, database's and application's journal volumes reflect the file close and commit operations through he appropriate marker. During the restore procedure, the storage subsystem uses the contents of the marker read from the journal to create a set of restore images of the primary volume specified by the filename and the file version.

Additionally, the application may store information on the transaction affecting the file in the application log, which is stored in the storage subsystem 30 or on the local disc attached to the host 10. The stored transaction information may be used by the application administrator to restore the state of the application at a specific point in time. Each such log entry may include the time of the commit, the path information, the filename, the file version and the transaction ID, such as system change number (SCN) in the Oracle database.

Restore Operation

During the restore operation, the application administrator may specify the restore point for the file using one of two methods. The first method is based on the application log, which is taken during the normal operation. The second method involves searching for the filename and version using the agent's file searching functionality via a command line interface of the agent or the console 23 or 402.

When the application administrator is in possession of the information on the file, including file path, name, and version, he or she may execute the following restore operation via the agent 19 from the console 23 or 402. The aforesaid restore procedure will be described in detail below with reference to FIG. 13.

The restore procedure starts with step 140, whereupon the administrator requests the consistency manager 28 to create restore images for the created volume dependency by specifying an attribute. The specified attribute encompasses information on the path, filename, and version of the file. The attribute may include an application transaction identifier to uniquely identify the state of the file. With respect to the specified point-in-time version of the file, the administrator may want to restore a set of volumes associated with the file, such as metadata stored in the database, changes to which were committed during the file closing operation.

At step 141, the agent issues a DMapImagesToVLUs operation though the CMD device of the storage subsystem 30.

At step 142, the consistency manager 28 executes the DMapImagesToVLUs operation. Steps 142 through 152 reflect the execution of the DMapImagesToVLUs. Now, the timed sequence of steps for the DMapImagesToVLUs process will be described in detail. At first, the consistency manager checks whether the volume dependency table 170 contains information indicating that there is a dependency associated with the specified volume.

At step 143, the consistency manager requests the journal manager to search the footer records of on the master journal volume for attributes.

At step 144, the journal manager returns the result to the consistency manager.

At step 145, the consistency manager checks the information received from the journal manager for the existence of the attribute on the master journal. If the attribute exists, the process proceeds with step 146. If the attribute does not exist, the consistency manager returns error.

At step 146, the consistency manager requests the journal manager to search the footer records on the slave journal volume for the attribute, in order to verify whether there is the attribute marker on slave journal volume.

At step 147, the journal manager returns the search result to the consistency manager.

At step 148, the consistency manager checks the information received from the journal manager for the existence of the attribute on the slave journal volume. If the attribute exists, the process proceeds with step 149. If the attribute does not exist, consistency manager returns error.

At step 149, the consistency manager requests JNL manager to create a restore image for the master volume and map the restore image on a created virtual LU using the MapImageToVLU function call.

At step 150, the JNL manager returns the result of the mapping operation involving the master volume to the consistency manager.

At step 151, the consistency manager requests the journal manager to create a restore image for the slave volume and map the restore image on the created virtual LU using the MapImageToVLU function call. It should be noted that the aforesaid step 151 is generally equivalent to the step 135 of the process shown in FIG. 14.

At step 152, the journal manager returns the result of the mapping operation involving the slave volume to the consistency manager.

At step 153, the consistency manager returns the result indicating the status of the DMapImagesToVLUs request to the agent.

At step 154, the agent returns the results of the volume restore request to the administrator thought the agent's application programming interface.

At step 155, if the DMapImagesToVLUs request was successfully completed, the administrator executes discovery commands to discover the created recovery volume within the storage subsystem.

At step 156, the host discoveries the new volumes associated with a virtual LU on the storage area network using a SCSI inquiry command.

At step 157, the storage subsystem provides the discovered volumes and their status to the administrator. Whereupon, the procedure terminates.

After the step 157 has successfully completed, the administrator may mount file system to the recovery volumes after the execution of the filesystem recovery command such as fsck, mount a database (which may involve database recovery), and then start the application.

Figure 13:
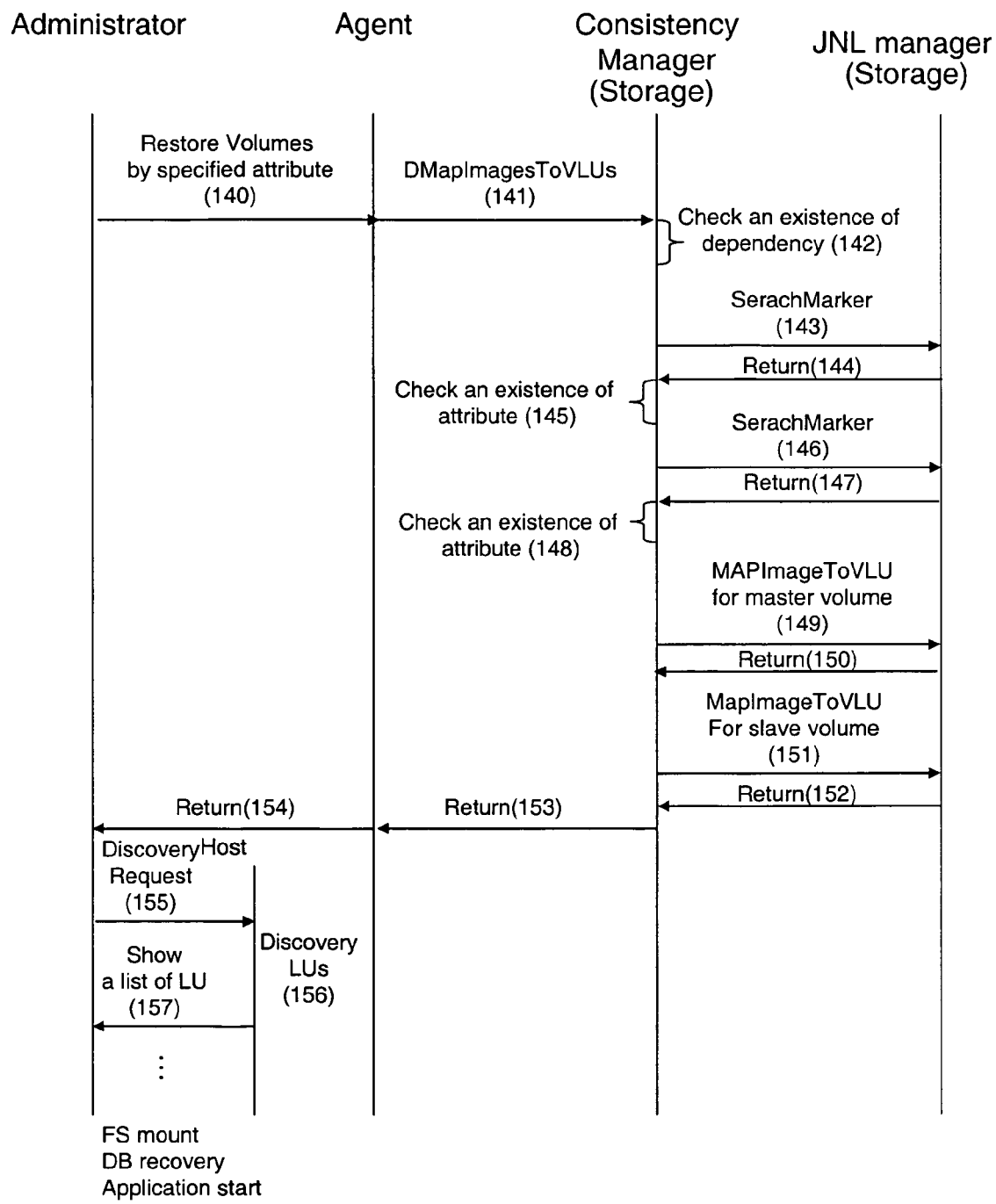
FIG. 13 illustrates an exemplary embodiment of an operating sequence of the restore procedure.
Figure 14:
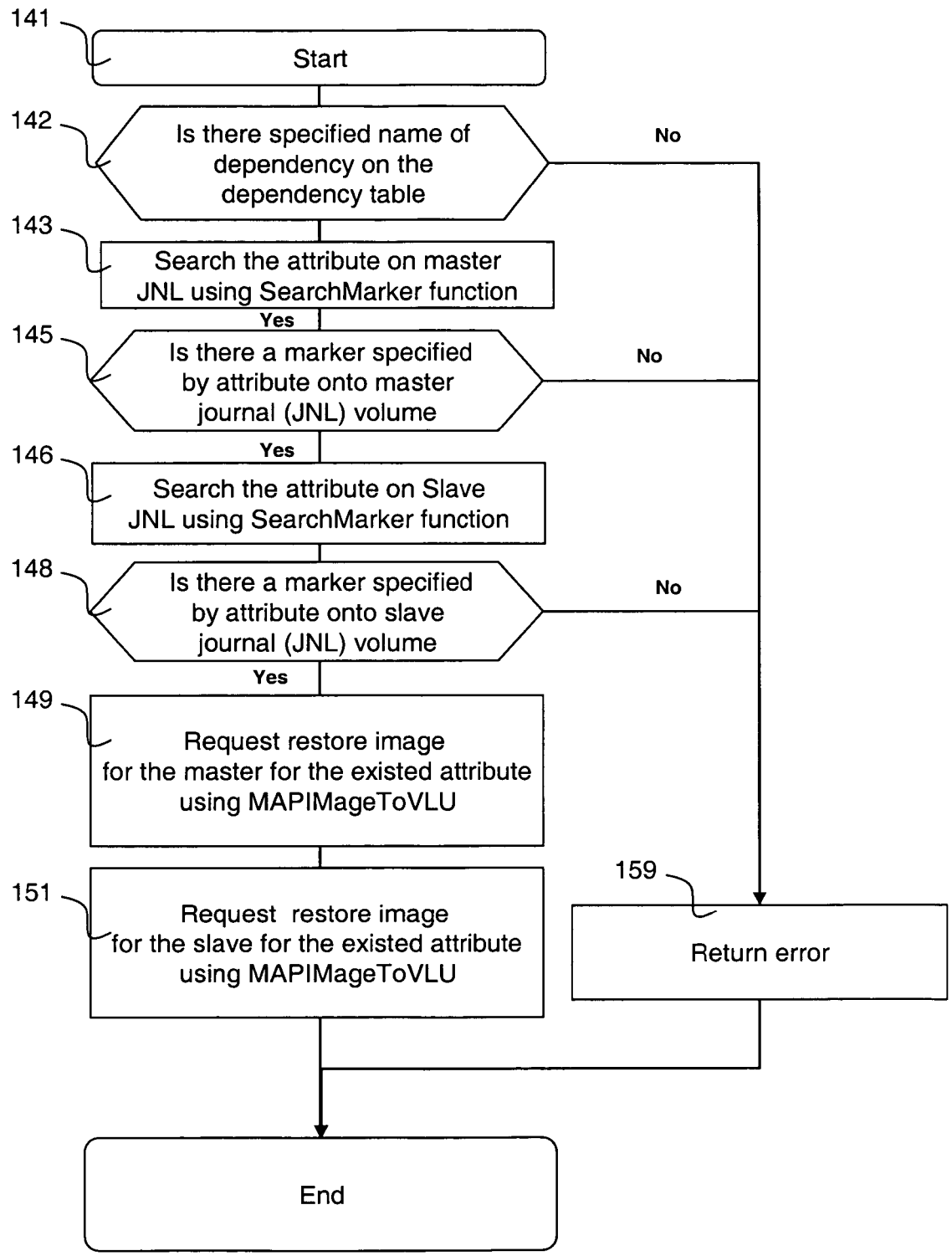
FIG. 14 illustrates an exemplary embodiment of a procedure for creation of a set of restore images.

FIG. 14 illustrates the detailed operating procedure of the consistency manager, which was extracted from the time sequence of FIG. 13.

The procedure begins with the step 141, whereupon the consistency manager receives a request to create a restore image based on specific attributes supplied by the administrator.

At step 142, the consistency manager checks the volume dependency table 170 for the existence of a dependency affecting the specified volume. If the dependency exists, the procedure continues with step 143. If the dependency does not exist, the operation proceeds to step 159.

At step 143, the consistency manager requests the journal manager to search the footer records in the master journal volume for the attributes specified by the administrator.

At step 145, the consistency manager searches for a marker containing the specified attribute on the master journal volume. For example, the attribute may include path, filename, and/or file version information. Specifically, the journal manager looks for a marker on the journal volume, which indicates the execution of the close operation on the specific version of the file. If the requisite marker is found, the procedure proceeds with step 146. If the marker is not located, the operation continues to step 159.

At step 146, the consistency manager requests the journal manager to search all footer records in the slave journal volume for the attributes specified by the administrator.

At step 148, the consistency manager determines if the marker corresponding to the specified attribute is present on the slave journal volume. For example, the attribute may include information on the path, filename, and/or version of the file. If the marker is found, the procedure proceeds with step 149. If the marker is not located, the procedure continues with the step 159.

At step 149, the consistency manager requests the journal manager to create a restore image for the master volume and to map the restore image to the created virtual LU using the MapImageToVLU function call. The restore image is allocated to the virtual LU in an ascending order by the LUN. If the sufficient number of virtual LUs is not available, the journal manager returns error to the consistency manager and the consistency manager also returns error.

At step 151, the consistency manager requests the journal manager to create a restore image for the slave volume and to map the created restore image on the created virtual LU using the MapImageToVLU function call. The restore images are allocated to the virtual LUs in an ascending order by the LUN. If the sufficient number of virtual LUs is not available, the journal manager returns error to the consistency manager and the consistency manager also returns error.

At step 159, the consistency manager returns error to the application because it could find the specified markers. Whereupon, the procedure terminates.

SECOND EMBODIMENT

The second embodiment of the inventive concept, the consistency manager 117 resides on the host 10, rather than on the storage subsystem 30, as in the first embodiment. As in the first embodiment, the consistency manager provides the capability to manage data consistency between a database and a file. Specifically, the consistency manager insures that the administrator can restore a database and a file having a specified version at a specified point in time.

The differences in the logical configuration and restore operation of the second embodiment will be discussed in detail below and, where appropriate, compared with the corresponding features of the first embodiment.

Logical Configuration

Figure 15:
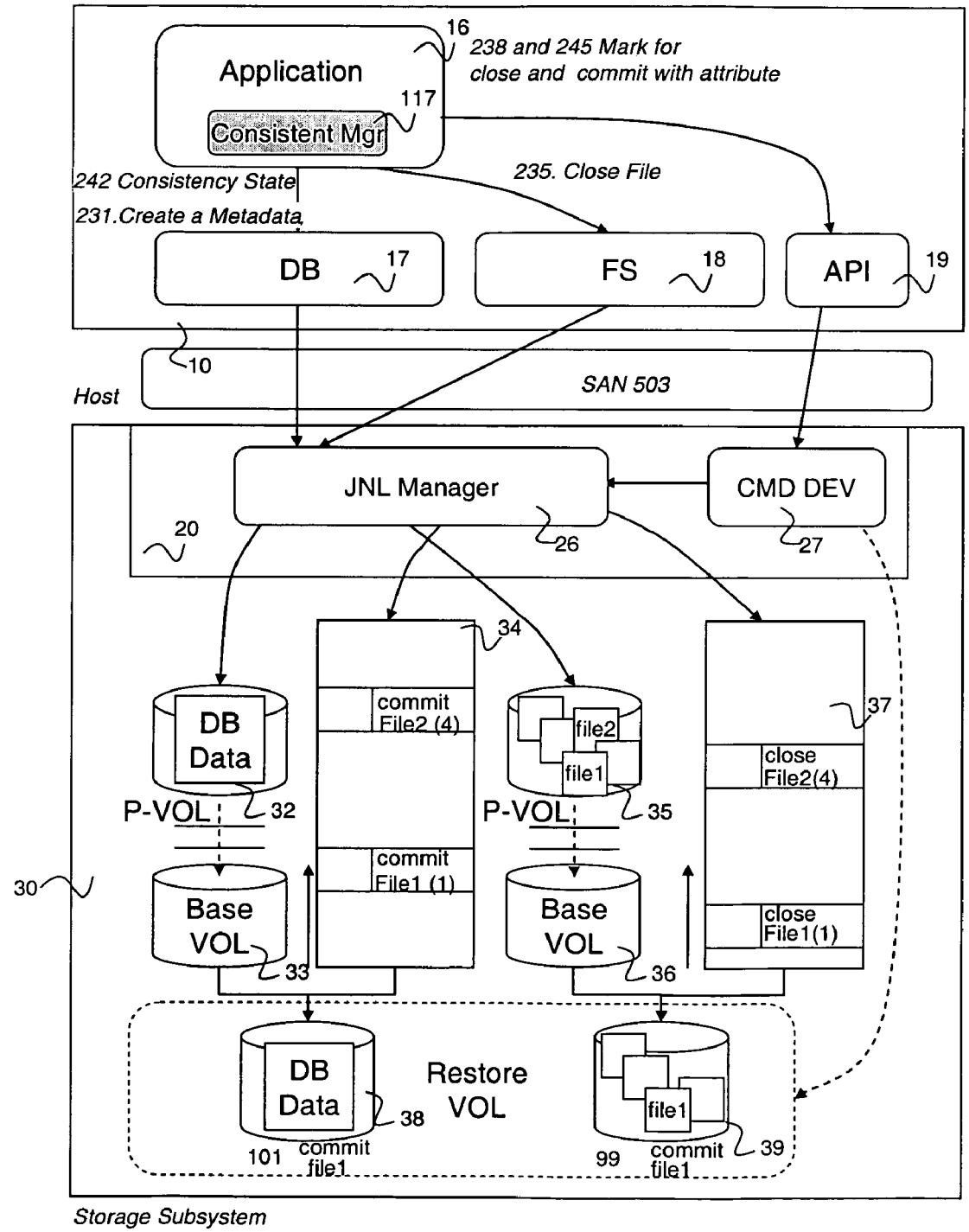
FIG. 15 shows a diagram illustrating an exemplary logical configuration of various software components of another embodiment of the inventive system as well as logical interconnections among these software components.

FIG. 15 illustrates a logical configuration of the second embodiment of the inventive concept. As can be seen from FIG. 15, the consistency manager 117 resides in the host 10, instead of the storage subsystem 30. The consistency manager 117 may be implemented as a part of an application module, or may reside in a module external to the application. In addition, in the second embodiment, the consistency manager 117 maintains the volume dependency table 170, instead of the storage subsystem, as in the first embodiment.

As it was described hereinabove, in the first embodiment, the consistency manager 117 invokes the VolumeDependency function to manage the volume dependency table 170, stored on the storage subsystem. In the second embodiment, the consistency manager 117 residing on the host manages the aforesaid table directly.

Operating Procedure—Normal Operation

Initially, a database administrator or an application administrator creates a dependency between the filesystem volume and the database volume using the VolumeDepdency function. This dependency is created using the consistency manager 117 residing on the host 10. as would be appreciated by those of skill in the art, this operation replaces the step 230 of the procedure shown in FIG. 11. The consistency manager keeps the created dependency configuration in the volume dependency table 170. The file storing operation performed by the application 16 in FIG. 15 is the same as the corresponding operation performed at steps 231 through 247 of the procedure shown in FIG. 11.

Operating Procedure—Restore Operation

Figure 16:
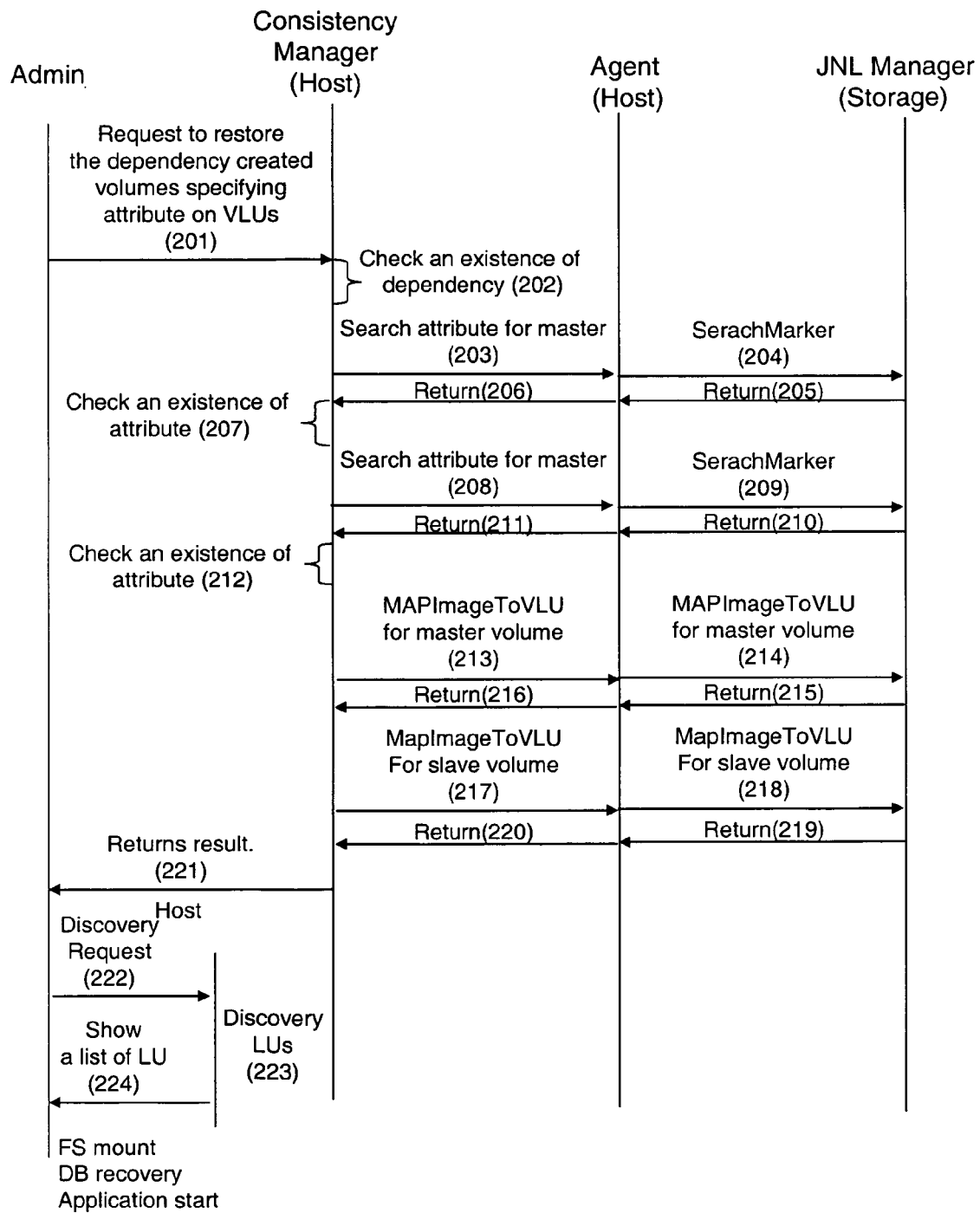
FIG. 16 illustrates an exemplary embodiment of an operating sequence of the restore procedure.

Due to the fact that in the second embodiment the consistency manger 117 resides on the host 10, the restore operation of the first embodiment shown in FIG. 13 is changed. The new restore procedure is shown in FIG. 16. The procedure starts with step 201, whereupon the administrator requests the consistency manager to create restore images for the volume dependency by specifying appropriate attribute values. The created restore images are to me linked to virtual LUs. The specified attribute may include information on the path, filename, and version of the file to be restored.

At step 202, the consistency manager executes the DMapImagesToVLUs operation, which will be described with reference to steps 202 through 220 of the procedure shown in FIG. 16. First, the consistency manager checks whether there exists a dependency for the specified volume in the volume dependency table 170.

At step 203, the consistency manager requests the agent to search the footer records of the master journal volume for a marker containing a specified attribute. The searching is performed using the SearchMarker function call.

At step 204, pursuant to the received search request from the consistency manager, the agent requests the journal manager to search for the attribute on the master volume journal using the SearchMarker function.

At step 205, the journal manager returns the search result to the agent.

At step 206, the agent returns the result of the search request to the consistency manager.

At step 207, the consistency manager checks whether the received search results indicate the existence of the requisite attribute. If the attribute exists, the process continues with step 208. If the attribute does not exist, the consistency manager returns error.

At step 208, the consistency manager requests the agent to search the footer records of the slave journal volume for a marker containing a specified attribute. The searching is performed using the SearchMarker function call.

At step 209, pursuant to the received search request from the consistency manager, the agent requests the journal manager to search for the attribute on the slave volume journal using the SearchMarker function.

At step 210, the journal manager returns the search result to the agent.

At step 211, the agent returns the result of the search request to the consistency manager.

At step 212, the consistency manager checks whether the received search results indicate the existence of the requisite attribute. If the attribute exists, the process continues with step 213. If the attribute does not exist, the consistency manager returns error.

At step 213, the consistency manager requests the agent to create a restore image for the master volume and to map the created restore image to a created virtual LU using the MapImageToVLU function call.

At step 214, pursuant to the request received from the consistency manager, the agent requests the journal manager to create a restore image for the master volume and to map the restore image to the created virtual LU using the MapImageToVLU function call.

At step 215, the journal manager returns the result of the restore image creation and mapping operations to the agent.

At step 216, the agent returns the result to the consistency manager.

At step 217, the consistency manager requests agent to create a restore image for slave volume and to map the restore image on created VLU using MapImageToVLU.

At step 218, the agent requests the journal manager to create a restore image for the slave volume and to map the restore image on the created virtual LU using the MapImageToVLU function call.

At step 219, the journal manager returns the result of the restore image creation and mapping operations to the agent.

At step 220, the agent returns the result to the consistency manager.

At step 221, the consistency manager 117 returns the results of the restore operation to the administrator thought the agent.

At step 222, if the DMapImagesToVLUs request was successfully completed, the administrator executes discovery commands to discover the created recovery volume within the storage subsystem.

At step 223, the host discoveries the new volumes associated with a virtual LU on the storage area network using a SCSI inquiry command.

At step 224, the host provides the discovered volumes and their status to the administrator. Whereupon, the procedure terminates.

After the step 224 has successfully completed, the administrator may mount file system to the recovery volumes after the execution of the filesystem recovery command such as fsck, mount a database (which may involve database recovery), and then start the application.

Using the procedure shown in FIG. 16 and the associated DMapImagesToVLUs function call, the consistency manger 117 of the second embodiment deployed on the host controls the CDP of the storage subsystem 30. At steps 203 and 208, the consistency manager 117 requests marker information using the SearchMarker function call for each volume, as described in FIG. 16. At steps 213 and 217, the consistency manager requests the creation of the restore images using the MapImageToVLU function call by specifying the sequence number of the markers found in steps 203 and 208, as also described in FIG. 16.

Figure 17:
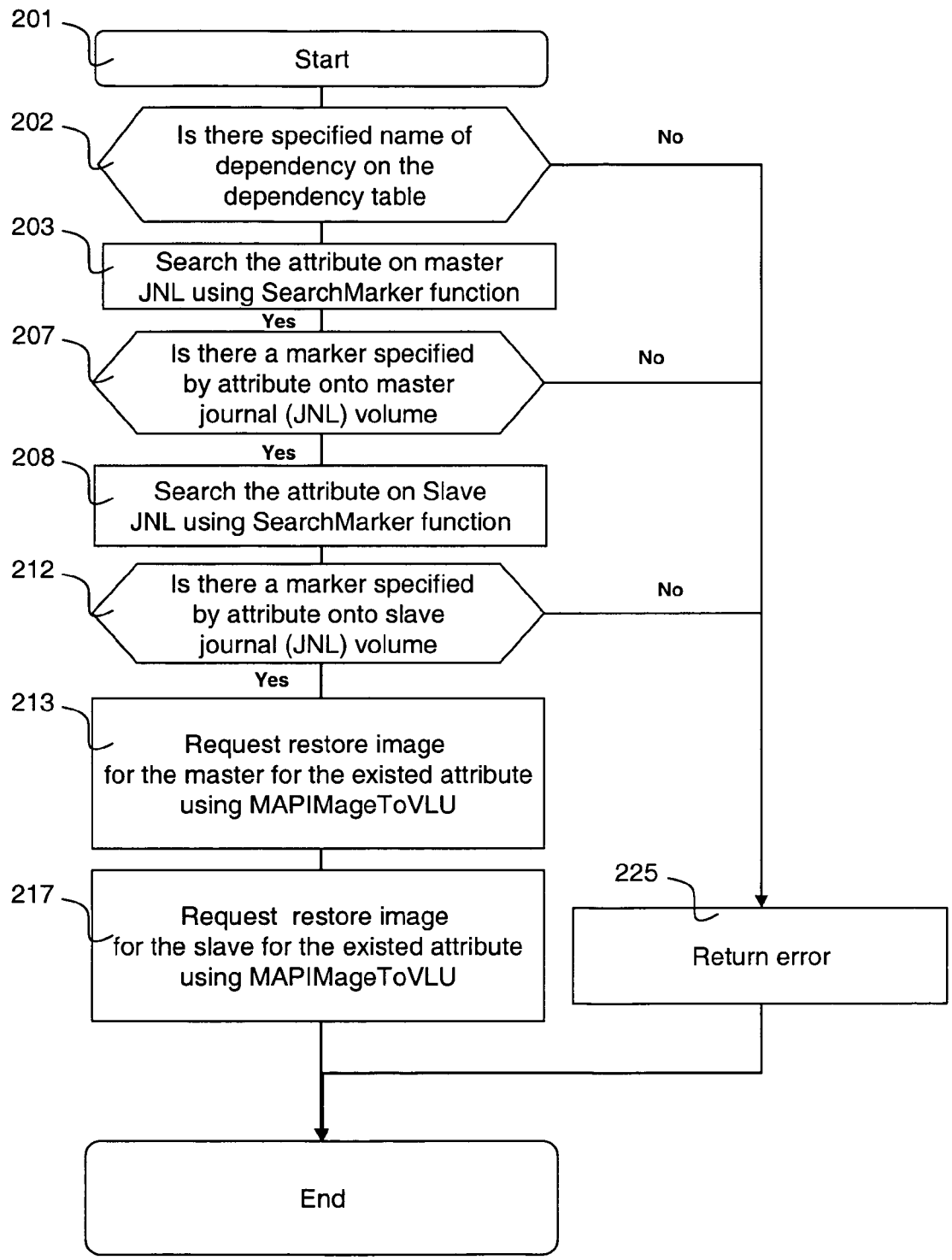
FIG. 17 illustrates an exemplary embodiment of a procedure for creating a set of restore images.

FIG. 17 illustrates the detailed operating procedure of the consistency manager, which was extracted from the time sequence of FIG. 16.

The procedure starts with step 201, whereupon the consistency manager receives a request to create a restore image based on the specific attributes provided by the administrator.

At step 202, the consistency manager checks whether the volume dependency table 170 contains information indicating that there is a dependency associated with the specified volume. If the dependency is detected, the operating procedure continues to step 203. If it is not, the procedure proceeds to step 225.

At step 203, the consistency manager requests the journal manager to search the footer records of on the master journal volume for attributes.

At step 207, the consistency manager checks the information received from the journal manager for the existence of the attribute on the master journal. If the attribute exists, the process proceeds with step 208. If the attribute does not exist, the consistency manager returns error at step 225.

At step 208, the consistency manager requests the journal manager to search the footer records on the slave journal volume for the attribute, in order to verify whether there is the attribute marker on slave journal volume.

At step 212, the consistency manager checks the information received from the journal manager for the existence of the attribute on the slave journal volume. If the attribute exists, the process proceeds with step 213. If the attribute does not exist, consistency manager returns error at step 225.

At step 213, the consistency manager requests JNL manager to create a restore image for the master volume and map the restore image on a created virtual LU using the MapImageToVLU function call. The restore images are allocated to the virtual LUs is an ascending order by LUN. If there the sufficient number of virtual LUs is not available, the journal manager returns error and the consistency manager also returns error.

At step 217, the consistency manager requests the journal manager to create a restore image for the slave volume and map the restore image on the created virtual LU using the MapImageToVLU function call. The restore images are allocated to the virtual LUs is an ascending order by LUN. If there the sufficient number of virtual LUs is not available, the journal manager returns error and the consistency manager also returns error. Whereupon the procedure terminates.

THIRD EMBODIMENT

In the third embodiment of the inventive concept, the consistency manager 118 resides on the host 10 and restores the filesystem based not on the file attributes, as in the first two embodiment, but on the database transaction identifier associated with the version of the file to be restored.

If the database performs a rollback or roll forward operation to restore the database tables at a specific time point, the filesystem, which is managed by the database, needs to be restored to the same time point. In the third embodiment, the database stores the attributes of the last updated file version as an entry in the tablespace. Whenever the file is closed, the stored attribute entry is updated.

The third embodiment will be described in the light of the first embodiment and the differences between the two will be explained in detail. The most significant differences are in the logical configuration, normal operating sequence and the restore operating sequence.

Logical Configuration

Figure 18:
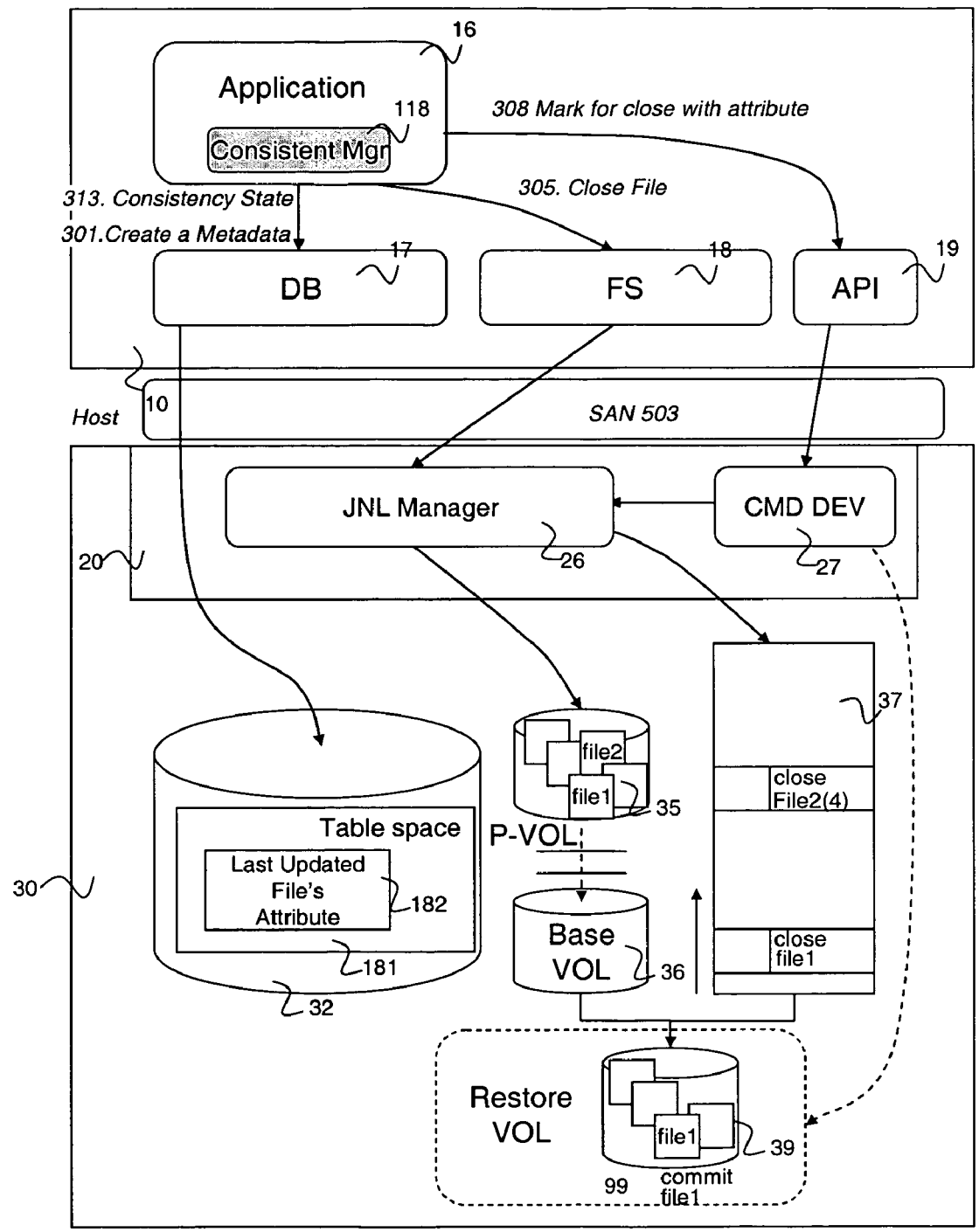
FIG. 18 shows a diagram illustrating an exemplary logical configuration of various software components of another embodiment of the inventive system as well as logical interconnections among these software components.

An exemplary logical configuration of a system in accordance with the third embodiment is shown in FIG. 18. The configuration of the host system 10 in the third embodiment is as same as in the second embodiment. However, the configuration of storage subsystem 30 is somewhat different.

Specifically, the storage subsystem 30 provides a database volume 32 which is not protected by the volume based CDP. The database table space 181 residing on the volume 32 manages the attributes 182 of the last updated file version, stored therein. The stored attributes include path, filename, and/or version for the file to be restored.

Operating Procedure—Normal Operation

Figure 19:
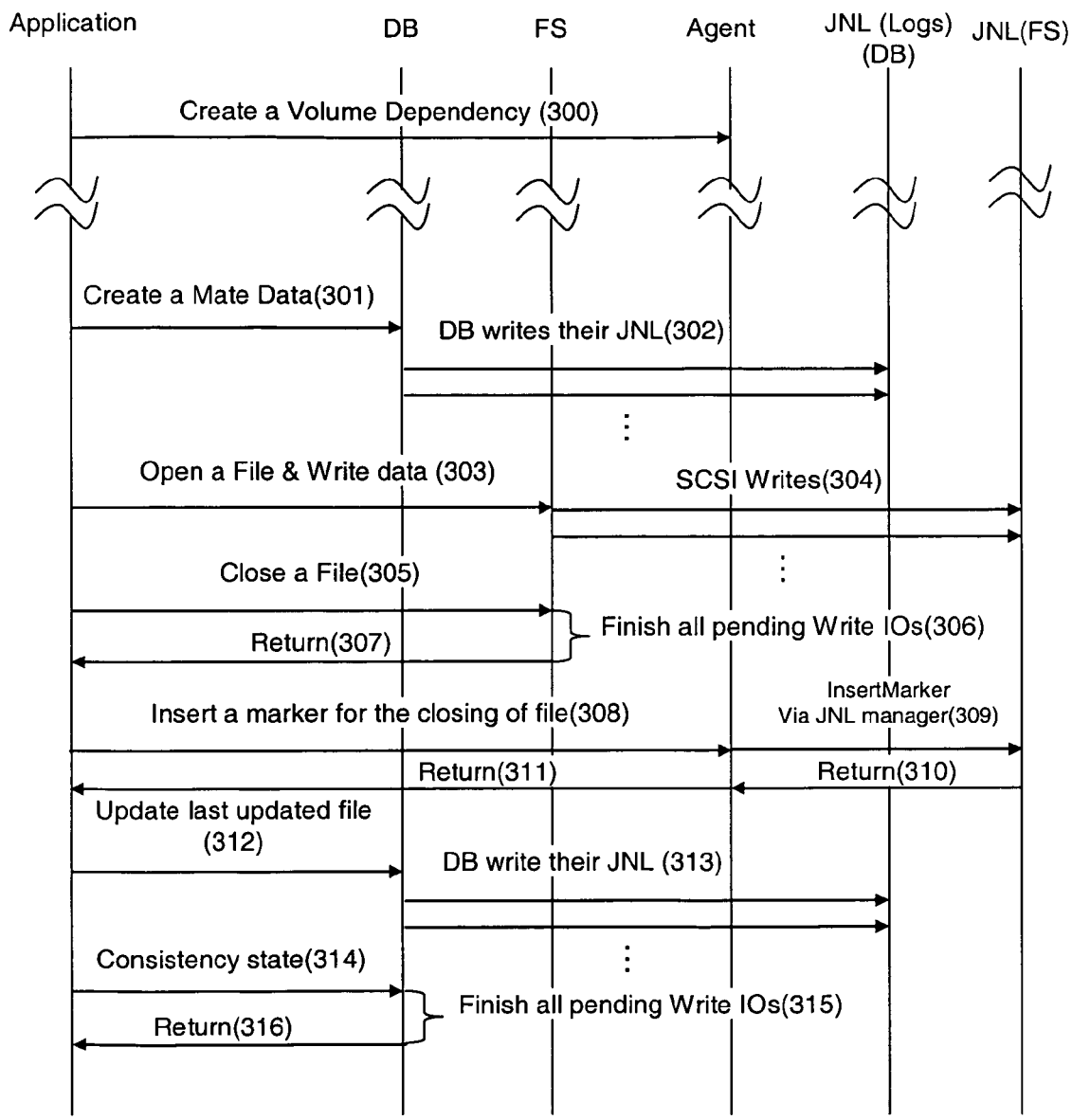
FIG. 19 illustrates an operating sequence of an embodiment of the inventive concept.

First, at step 300 of FIG. 19, an application administrator creates a dependency between the database volume and the filesystem volume in the same manner as in the second embodiment. However, in the third embodiment, the CDP does not protect the database volume. Because the third embodiment relies on the database's internal tablespace protection mechanism, the storage subsystem 30 does not need to preserve the restore information for the database. Therefore, instead of using the agent to insert appropriate markers into the CDP's journal and database's online journal, the application may simply change the file metadata in the database table and rely on the database, rather than the CDP's journal, to provide the restore capabilities for the metadata.

The operating sequence of the third embodiment is shown in FIG. 19 and is described in detail below.

At step 301, the application creates a new metadata for the file and writes the created metadata to a database table.

At step 302, the database updates the table space data for the new metadata on the database volume, which is designated by the administrator as a slave volume. The journal manager stores the metadata on the database journal.

At step 303, the application opens the file pointer and writes the file data to the filesystem.

At step 304, the filesystem updates file data on the filesystem volume, which is designated as a master volume. The journal manager stores the updated data on the filesystem journal.

At step 305, the application closes the files.

At step 306, the filesystem flushes all the pending write operations to the filesystem volume.

At step 307, the filesystem returns the result of the file close request to the application.

At step 308, the application inserts a marker into the master journal volume (filesystem journal volume). The inserted marker includes the version of the file. The version number starts with zero and is incremented sequentially. The application increments the version number on creation, modification, and deletion of the file.

At step 309, the agent inserts the corresponding marker into the journal using the InsertMarker function call. The journal manager stores the inserted marker on the filesystem (master) journal.

At step 310, the journal manager returns the result of the marker insertion operation to the agent.

At step 311, the agent returns the result of the marker insertion operation to the application.

At step 312, the application updates the attributed of the last updated file. The attributes may include path, filename and/or version for the file updated in Step 305. The attribute may include the transaction identifier specifying the associated database transaction.

At step 313, the database updates its table space as well as the database's journal.

At step 314, the application makes a request for the generation of a consistent state. Before the commit operation, the database may enter into a backup mode. An example of a consistent state request includes execution of a commit command.

At step 315, the database flushes all pending write operations affecting the tablespace to the storage volume storing the database tables.

At step 316, the database returns the result of the request for consistent state. After the commit operation, which flushes out all pending data write requests, the database may exit from the backup operating mode.

Upon the restore, the storage subsystem uses the attributes associated with the last updated file and stored in the database, as well as the inserted marker, to create a set of restore images on a restore volume, as specified by a specified transaction identifier.

Operating Procedure—Restore Operation

The restore operation in the system of the third embodiment is somewhat similar to the corresponding operation of the second embodiment.

However, certain differences exist in the DMapImagesToVLUs sequence shown in FIG. 13 in connection with the second embodiment. Specifically, operations performed in the steps 146 through 148, which involved obtaining an attribute as well as steps 149 to 150 of the operating sequence of the second embodiment, are different in the third embodiment. Specifically, in the third embodiment, the consistency manager gets the file attributes from the tablespace of the database after the database completes the roll-forward or roll-back operation restoring the tablespace to a point specified by an appropriate transaction identifier. The attribute information is used to create a restore image for filesystem.

Figure 20:
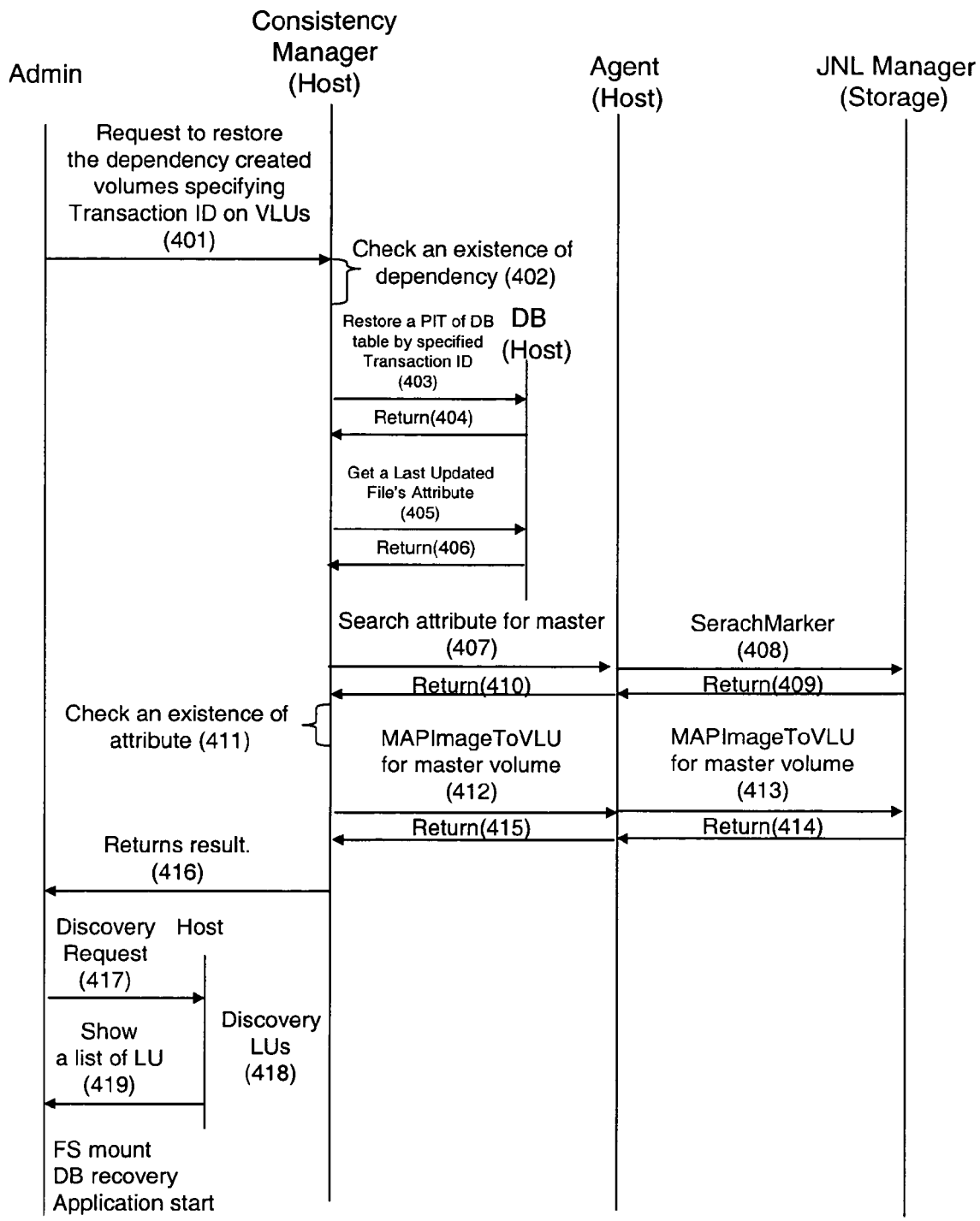
FIG. 20 illustrates an exemplary embodiment of an operating sequence of the restore procedure.

This operating sequence of the restore procedure for the third embodiment of the invention is illustrated in FIG. 20.

The restore procedure starts with step 401, whereupon the administrator requests the consistency manager to create restore images for the dependency affected volumes by specifying the transaction identifier. The file attributes consist of a path, filename, and version of the file to be restored.

At step 402, the consistency manager executes the DMapImagesToVLUs operation, see steps 402 through 416. Now, the timing sequence of the DMapImagesToVLUs process will be described with reference to FIG. 20. First, at step 402, the consistency manager uses the volume dependency table 170 to check for the existence of a dependency for the specified volume.

At step 403, the consistency manager requests the database to restore a point-in-time tablespace using roll-forward or roll-back operation and a specified transaction identifier.

At step 404, the database returns the result of the tablespace restore operation.

At step 405, the consistency manager requests the database to retrieve attributes for the last version of the file.

At step 406, the database returns the result of the attribute request.

At step 407, the consistency manager requests the agent to search all footer records on the master journal volume for the marker containing the requisite attributes provided by the database. The search is performed using the SearchMarker function call.

At step 408, the agent requests the journal manager to search for the attribute on the master volume's journal using the SearchMarker function call.

At step 409, the journal manager returns the result of the marker search.

At step 410, the agent returns the result of the marker search to the consistency manager.

At step 411, the consistency manager checks existence of the attribute based on the returned search results. If the marker is found, the process continues with the step 412. If the marker is not found, the consistency manager returns error.

At step 412, the consistency manager requests the agent to create a restore image for the master volume and to map the restore image to the created virtual LU using the MapImageToVLU function call.

At step 413, the agent requests the journal manager to create a restore image for the master volume and to map the restore image on the created virtual LU using the MapImageToVLU function call.

At step 414, the journal manager returns the result of the restore volume creation and mapping operation to the agent.

At step 415, the agent returns the result of the restore volume creation and mapping operation to the consistency manager.

At step 416, the consistency manager returns the result of the volume restore request to the administrator thought the agent.

At step 417, if the DMapImagesToVLUs request was successfully completed, the administrator executes discovery commands to discover the created recovery volume within the storage subsystem.

At step 418, the host discoveries the new volumes associated with a virtual LU on the storage area network using a SCSI inquiry command.

At step 419, the host provides the discovered volumes and their status to the administrator. Whereupon, the procedure terminates.

After the step 419 has successfully completed, the administrator may mount file system to the recovery volumes after the execution of the filesystem recovery operation, such as fsck, mount a database (which may involve database recovery), and then start the application.

Figure 21:
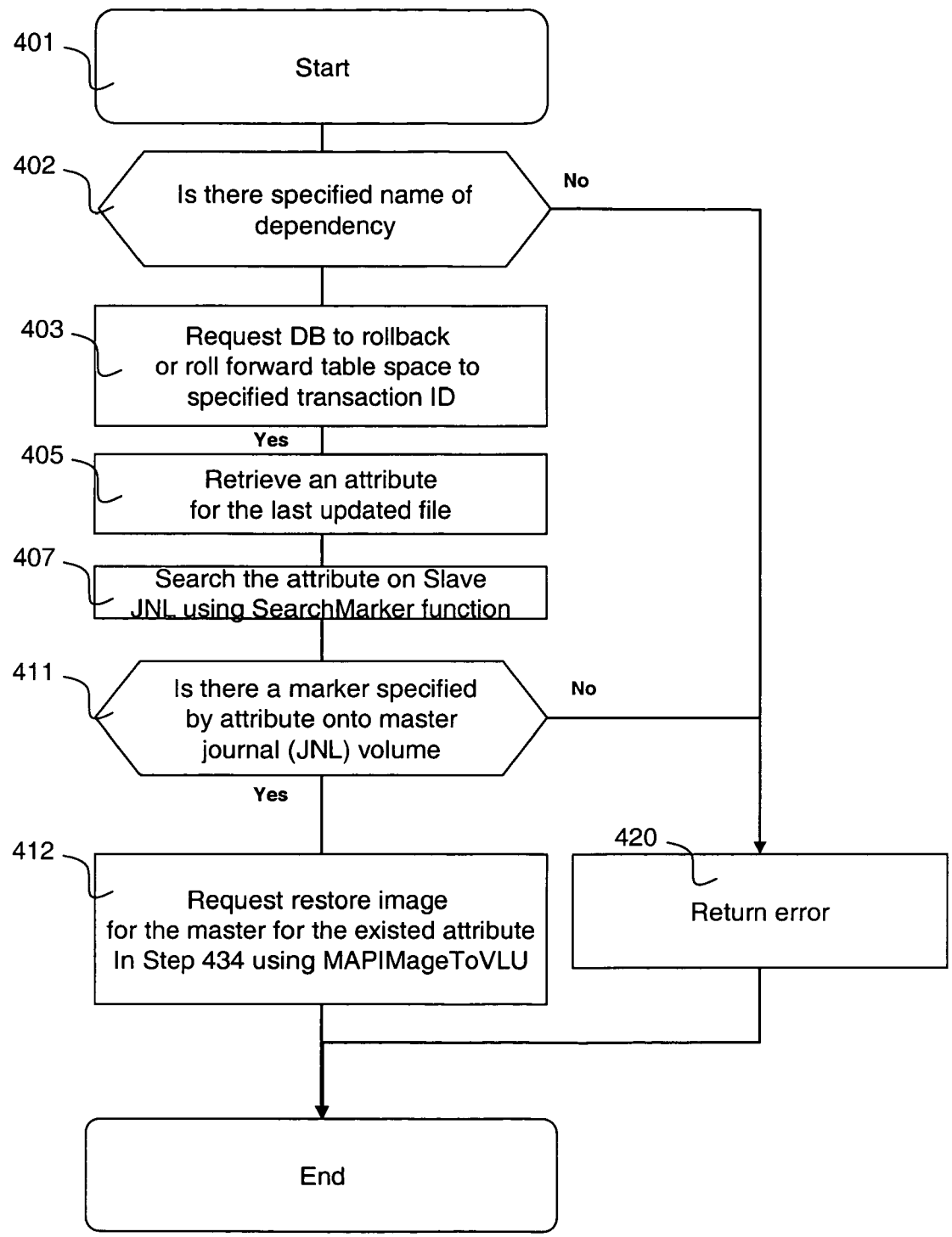
FIG. 21 illustrates an exemplary embodiment of a procedure for creation of a restore image.

Using the DMapImagesToVLUs operation, the consistency manger residing on the host controls the CDP deployed on the storage subsystem. The consistency manager manages the creation of the restore image for a specified transaction identifier. The procedure for creation of the restore image is illustrated in FIG. 21 and is described in detail below.

The procedure begins with the step 401, whereupon the consistency manager receives a request to create a restore image.

At step 402, the consistency manager checks the volume dependency table 170 as to whether there is a dependency affecting the specified volume. If the dependency exists, the procedure continues with the step 403. If it does not, the operating sequence proceeds to step 420.

At step 403, the consistency manager recovers a point-in-time tablespace of the database using the roll-forward or rollback operation and the specified transaction identifier.

At step 405, the consistency manager retrieves an attribute associated with the last version of the file from the database.

At step 407, the consistency manager requests the journal manager to search all footer records of the master journal volume for the retrieved attribute.

At step 411, the consistency manager determined if a marker corresponding to the specified attribute is present on the master journal volume. For example, the attribute may include path, filename, and version of the file. The consistency manager searches the master journal volume for a marker of a file close command corresponding to the specified version of the file. If the marker is found, the procedure proceeds to step 412. If it is not, the procedure continues to step 420.

At step 412, the consistency manager requests the journal manager to create a restore image of the master volume and to map the restore image to the created VLU using the MapImageToVLU function call described hereinabove. The order in which the restore images are allocated to the virtual LUs is ascending order. If sufficient number of virtual LUs is not available, the journal manager returns error and the consistency manager also returns error at step 420. Whereupon, the procedure terminates.

Exemplary Hardware Platform

Figure 22:
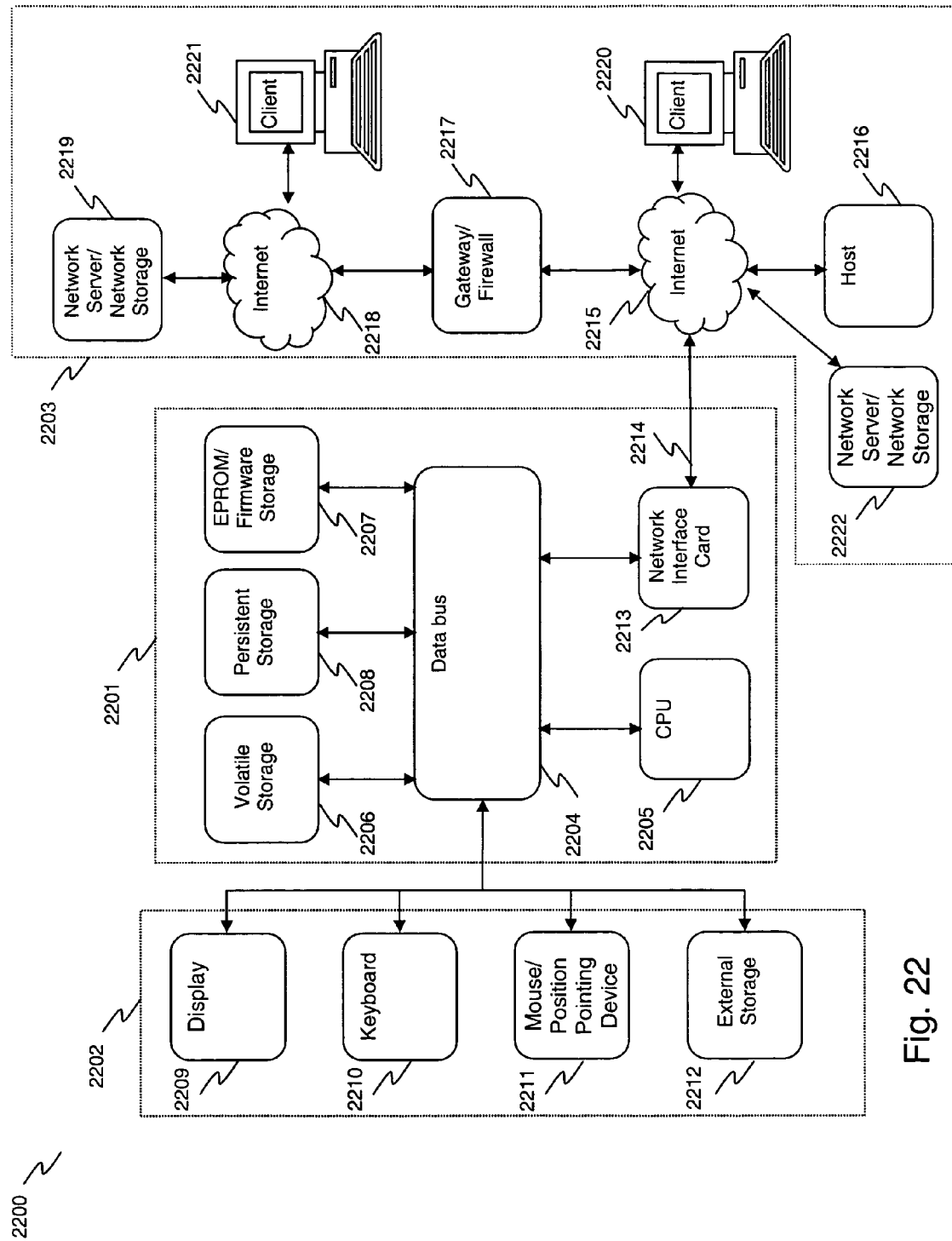
FIG. 22 illustrates an exemplary embodiment of a computer platform upon which the inventive system may be implemented.

FIG. 22 is a block diagram that illustrates an embodiment of a computer/server system 2200 upon which an embodiment of the inventive methodology may be implemented. The system 2200 includes a computer/server platform 2201, peripheral devices 2202 and network resources 2203.

The computer platform 2201 may include a data bus 2204 or other communication mechanism for communicating information across and among various parts of the computer platform 2201, and a processor 2205 coupled with bus 2201 for processing information and performing other computational and control tasks. Computer platform 2201 also includes a volatile storage 2206, such as a random access memory (RAM) or other dynamic storage device, coupled to bus 2204 for storing various information as well as instructions to be executed by processor 2205. The volatile storage 2206 also may be used for storing temporary variables or other intermediate information during execution of instructions by processor 2205. Computer platform 2201 may further include a read only memory (ROM or EPROM) 2207 or other static storage device coupled to bus 2204 for storing static information and instructions for processor 2205, such as basic input-output system (BIOS), as well as various system configuration parameters. A persistent storage device 2208, such as a magnetic disk, optical disk, or solid-state flash memory device is provided and coupled to bus 2201 for storing information and instructions.

Computer platform 2201 may be coupled via bus 2204 to a display 2209, such as a cathode ray tube (CRT), plasma display, or a liquid crystal display (LCD), for displaying information to a system administrator or user of the computer platform 2201. An input device 2210, including alphanumeric and other keys, is coupled to bus 2201 for communicating information and command selections to processor 2205. Another type of user input device is cursor control device 2211, such as a mouse, a trackball, or cursor direction keys for communicating direction information and command selections to processor 2204 and for controlling cursor movement on display 2209. This input device typically has two degrees of freedom in two axes, a first axis (e.g., x) and a second axis (e.g., y), that allows the device to specify positions in a plane.

An external storage device 2212 may be connected to the computer platform 2201 via bus 2204 to provide an extra or removable storage capacity for the computer platform 2201. In an embodiment of the computer system 2200, the external removable storage device 2212 may be used to facilitate exchange of data with other computer systems.

The invention is related to the use of computer system 2200 for implementing the techniques described herein. In an embodiment, the inventive system may reside on a machine such as computer platform 2201. According to one embodiment of the invention, the techniques described herein are performed by computer system 2200 in response to processor 2205 executing one or more sequences of one or more instructions contained in the volatile memory 2206. Such instructions may be read into volatile memory 2206 from another computer-readable medium, such as persistent storage device 2208. Execution of the sequences of instructions contained in the volatile memory 2206 causes processor 2205 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2205 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 2208. Volatile media includes dynamic memory, such as volatile storage 2206. Transmission media includes coaxial cables, copper wire and fiber optics, including the wires that comprise data bus 2204. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 2205 for execution. For example, the instructions may initially be carried on a magnetic disk from a remote computer. Alternatively, a remote computer can load the instructions into its dynamic memory and send the instructions over a telephone line using a modem. A modem local to computer system 2200 can receive the data on the telephone line and use an infra-red transmitter to convert the data to an infra-red signal. An infra-red detector can receive the data carried in the infra-red signal and appropriate circuitry can place the data on the data bus 2204. The bus 2204 carries the data to the volatile storage 2206, from which processor 2205 retrieves and executes the instructions. The instructions received by the volatile memory 2206 may optionally be stored on persistent storage device 2208 either before or after execution by processor 2205. The instructions may also be downloaded into the computer platform 2201 via Internet using a variety of network data communication protocols well known in the art.

The computer platform 2201 also includes a communication interface, such as network interface card 2213 coupled to the data bus 2204. Communication interface 2213 provides a two-way data communication coupling to a network link 2214 that is connected to a local network 2215. For example, communication interface 2213 may be an integrated services digital network (ISDN) card or a modem to provide a data communication connection to a corresponding type of telephone line. As another example, communication interface 2213 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 2213 sends and receives electrical, electromagnetic or optical signals that carry digital data streams representing various types of information.

Network link 2213 typically provides data communication through one or more networks to other network resources. For example, network link 2214 may provide a connection through local network 2215 to a host computer 2216, or a network storage/server 2222. Additionally or alternatively, the network link 2213 may connect through gateway/firewall 2217 to the wide-area or global network 2218, such as an Internet. Thus, the computer platform 2201 can access network resources located anywhere on the Internet 2218, such as a remote network storage/server 2219. On the other hand, the computer platform 2201 may also be accessed by clients located anywhere on the local area network 2215 and/or the Internet 2218. The network clients 2220 and 2221 may themselves be implemented based on the computer platform similar to the platform 2201.

Local network 2215 and the Internet 2218 both use electrical, electromagnetic or optical signals that carry digital data streams. The signals through the various networks and the signals on network link 2214 and through communication interface 2213, which carry the digital data to and from computer platform 2201, are exemplary forms of carrier waves transporting the information.

Computer platform 2201 can send messages and receive data, including program code, through the variety of network(s) including Internet 2218 and LAN 2215, network link 2214 and communication interface 2213. In the Internet example, when the system 2201 acts as a network server, it might transmit a requested code or data for an application program running on client(s) 2220 and/or 2221 through Internet 2218, gateway/firewall 2217, local area network 2215 and communication interface 2213. Similarly, it may receive code from other network resources.

The received code may be executed by processor 2205 as it is received, and/or stored in persistent or volatile storage devices 2208 and 2206, respectively, or other non-volatile storage for later execution. In this manner, computer system 2201 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with data replication functionality. It is intended that the specification and examples be considered as exemplary only, with a true scope and spirit of the invention being indicated by the following claims.

What is claimed is:

1. A computer-implemented method comprising:
    creating a volume dependency between a filesystem volume and a database volume, the filesystem volume being associated with a master journal and the database volume being associated with a slave journal;
    storing metadata associated with a file in a database associated with the database volume;
    writing update data to the file in the filesystem volume;
    closing the file in the filesystem volume;
    inserting a marker into the master journal, the marker descriptive of the file closing operation;
    updating the file;
    performing a consistency state operation in the database associated with the database volume;
    receiving a restore volume request comprising a transaction identifier descriptive of a transaction in the database;
    verifying the existence of the volume dependency between the filesystem volume and the database volume;
    restoring a point-in-time version of the database using the received database transaction identifier;
    reading at least one attribute of the last version of the file from the database;
    searching for the marker in the master journal, the marker comprising the at least one attribute; and
    restoring the filesystem volume based on the marker; the restoring comprising:
        i. checking information received from a journal manager for existence of the at least one attribute in the master journal;
        ii. returning an error message if the at least one attribute does not exist in the master journal; and
        iii. requesting the journal manager to search footer records in the slave journal for the at least one attribute, wherein if the at least one attribute does exist in the slave journal, returning an error, and wherein if the at least one attribute does exist in the slave journal, requesting the journal manager to create a restore image for the filesystem volume.

2. The computer-implemented method of claim 1, further comprising making a point-in-time copy of the filesystem volume in a base volume, wherein restoring the filesystem volume further comprises applying at least a portion of the journal to the base volume.

3. The computer-implemented method of claim 1, wherein creating a volume dependency comprises designating the filesystem volume as a master volume and designating the database volume as a slave volume.

4. The computer-implemented method of claim 1, wherein restoring the filesystem volume further comprises creating a filesystem restore image and mapping the created filesystem restore image to a virtual logical unit.

5. The computer-implemented method of claim 4, further comprising receiving a discovery request and providing information on the virtual logical unit mapped to the filesystem restore image in response to the received discovery request.

\* \* \* \* \*